United States Patent
Itkowitz

(10) Patent No.: US 12,528,192 B2
(45) Date of Patent: Jan. 20, 2026

(54) METHOD AND APPARATUS FOR PROVIDING INPUT DEVICE REPOSITIONING REMINDERS

(71) Applicant: Intuitive Surgical Operations, Inc., Sunnyvale, CA (US)

(72) Inventor: Brandon D. Itkowitz, San Jose, CA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 187 days.

(21) Appl. No.: 18/288,511

(22) PCT Filed: Apr. 26, 2022

(86) PCT No.: PCT/US2022/026383
§ 371 (c)(1),
(2) Date: Oct. 26, 2023

(87) PCT Pub. No.: WO2022/232170
PCT Pub. Date: Nov. 3, 2022

(65) Prior Publication Data
US 2024/0208065 A1    Jun. 27, 2024

Related U.S. Application Data

(60) Provisional application No. 63/181,022, filed on Apr. 28, 2021.

(51) Int. Cl.
*B25J 9/16* (2006.01)
*A61B 34/00* (2016.01)
*A61B 34/35* (2016.01)

(52) U.S. Cl.
CPC ............. *B25J 9/1689* (2013.01); *A61B 34/35* (2016.02); *A61B 34/76* (2016.02)

(58) Field of Classification Search
USPC .............................. 700/245–264; 606/1, 130
See application file for complete search history.

(56) References Cited

U.S. PATENT DOCUMENTS

| 5,876,325 A | 3/1999 | Mizuno et al. |
| 6,424,885 B1* | 7/2002 | Niemeyer ............. A61B 34/77 |
| | | 600/109 |

(Continued)

FOREIGN PATENT DOCUMENTS

| WO | WO-2008002830 A2 | 1/2008 |
| WO | WO-2009158164 A1 | 12/2009 |

(Continued)

OTHER PUBLICATIONS

International Search Report and Written Opinion for Application No. PCT/US2022/026383, mailed Aug. 2, 2022, 13 pages.

(Continued)

*Primary Examiner* — Jonathan L Sample
(74) *Attorney, Agent, or Firm* — Patterson + Sheridan, LLP

(57) ABSTRACT

Systems and methods are described herein for providing reminders with a computer-assisted robotic system. In one example, a robotic system comprises head and hand input devices, and a control system. The head input device comprises a sensor configured to sense head inputs provided by a head of an operator. The hand input device comprises a hand input sensor configured to sense hand inputs provided by a hand of the operator. The control system is configured to, in a teleoperation mode, command a change in a display of an image based on head input signals provided by the head input device, where the image is obtained by an imaging device, and command motion of a tool based on hand input signals provided by the hand input device. The control system is further configured to, in a clutch mode, (Continued)

provide a reminder for the operator to reposition the hand input device.

25 Claims, 13 Drawing Sheets

(56) References Cited

U.S. PATENT DOCUMENTS

| | | | | |
|---|---|---|---|---|
| 8,808,164 | B2* | 8/2014 | Hoffman | A61B 34/32 |
| | | | | 600/101 |
| 9,179,832 | B2* | 11/2015 | Diolaiti | A61B 1/008 |
| 10,698,493 | B1* | 6/2020 | Crowther | G09B 5/02 |
| 11,751,967 | B2* | 9/2023 | Brasset | A61B 34/35 |
| | | | | 606/130 |
| 2016/0183930 | A1 | 6/2016 | Herzlinger et al. | |
| 2018/0025666 | A1 | 1/2018 | Ho et al. | |
| 2018/0092706 | A1* | 4/2018 | Anderson | G06F 3/013 |
| 2019/0041986 | A1* | 2/2019 | Rihn | G06F 3/016 |
| 2019/0254754 | A1* | 8/2019 | Johnson | A61B 34/76 |
| 2020/0261160 | A1* | 8/2020 | Peine | A61B 34/37 |
| 2021/0038335 | A1* | 2/2021 | Maret | A61B 34/74 |
| 2021/0104325 | A1* | 4/2021 | Chaoui | H04N 13/122 |

FOREIGN PATENT DOCUMENTS

| | | | | |
|---|---|---|---|---|
| WO | WO-2018195319 A1 * | 10/2018 | | G02B 27/0093 |
| WO | WO-2019014493 A1 | 1/2019 | | |
| WO | WO-2019023020 A1 | 1/2019 | | |
| WO | WO-2020260939 A1 * | 12/2020 | | A61B 34/74 |
| WO | WO-2021041248 A1 * | 3/2021 | | A61B 34/25 |
| WO | WO-2021041249 A1 * | 3/2021 | | A61B 34/35 |
| WO | WO-2021041253 A1 | 3/2021 | | |

OTHER PUBLICATIONS

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2022/026383, mailed Nov. 9, 2023, 11 pages.

* cited by examiner

METHOD AND APPARATUS FOR PROVIDING INPUT DEVICE REPOSITIONING REMINDERS

BACKGROUND

More and more devices are being replaced with computer-assisted electronic devices, including in industrial, entertainment, educational, medical and other settings. As a medical example, the hospitals of today have large arrays of electronic devices being found in operating rooms, interventional suites, intensive care wards, emergency rooms, and/or the like. Many of these electronic devices may be capable of autonomous or semi-autonomous motion. It is also common for personnel to control the motion and/or operation of electronic devices using one or more input devices located at an operator input system. As a specific example, minimally invasive, robotic telemedical systems permit medical personnel to teleoperatively perform procedures on patients from bedside or remote locations. Teleoperation refers generally to operation performed by operators using some form of remote control to manipulate tool movements rather than directly holding and moving the tools by hand.

When an electronic device is used to perform a task at a worksite, one or more imaging devices (e.g., an endoscope, an optical camera, and/or an ultrasound probe) can capture images of the worksite that provide visual feedback to an operator who is monitoring and/or performing the task. The imaging device(s) may also be controllable to update a view of the worksite that is provided, via a display unit, to the operator. For example, the imaging device(s) could be attached to a repositionable structure that includes two or more links coupled together by one or more joints, where the repositionable structure can be moved (including through internal reconfiguration) to update a position and/or orientation of the imaging device at the worksite. In such a case, movement of the imaging device(s) may be controlled by the operator or another person or automatically, and enable the view of the worksite to be changed.

An approach for controlling a view of a worksite provided using an imaging device is to change the view in response to the motion of a display unit. In this approach, the display unit operates as an input device, and can be termed a head input device, and the motion of the display unit or a part of the operator (e.g., the head of the operator) can be tracked and mapped to commanded motion for an imaging device, and used to control the motion of or view provided by the imaging device.

The operator may sometimes want to decouple control of the motion of the imaging device from motion of the display unit, such as to reposition himself/herself, the display unit, or another input device. A mode with such control decoupled may be called a "clutch mode" of the computer-assisted robotic system. It may be helpful to assist the operator with repositioning during the "clutch mode". Accordingly, improved methods and systems for assisting the operator with repositioning during the "clutch mode" are desirable.

SUMMARY

Systems and methods are described herein for providing reminders with a computer-assisted robotic system. In one example, a computer-assisted robotic system comprises a head input device, a hand input device, and a control system. The head input device includes one or more head input sensors configured to sense head inputs provided by a head of an operator of the robotic system, and to provide head input signals indicative of inputs sensed by the one or more head input sensors. The hand input device includes one or more hand input sensors configured to sense hand inputs provided by one or more hands of the operator, and to provide hand input signals indicative of inputs sensed by the one or more hand input sensors. The control system is communicatively coupled to the head and hand input devices. The control system is configured to, in a teleoperation mode, command a change in a display of an image based on the head input signals, where the image is obtained by an imaging device, and command motion of a tool based on the hand input signals. The control system is also configured to, in a clutch mode, provide a reminder for the operator to reposition the hand input device based on one or more parameters.

In another example, a method is described for operating a computer-assisted robotic system comprising a head input device and a hand input device. The head input device is configured to sense head inputs provided by a head of an operator of the robotic system. The hand input device is configured to sense hand inputs provided by one or more hands of the operator. The method includes receiving head input signals indicative of inputs sensed by the head input device, and receiving hand input signals indicative of inputs sensed by the hand input device. The method also includes, while the robotic system is in a teleoperation mode, commanding a change in a display of an image based on the head input signals, where the image is obtained by an imaging device coupled to the robotic system, and commanding motion of a tool based on the hand input signals, where the tool is coupled to the robotic system. The method further includes, while the robotic system is in a clutch mode, providing, based on one or more parameters, a reminder for the operator to reposition the hand input device.

In yet another example, a non-transitory machine-readable medium is provided. The non-transitory machine-readable medium includes a plurality of machine-readable instructions that, when executed by one or more processors associated with a robotic system, cause the computer-assisted robotic system to perform any of the methods described herein.

DETAILED DESCRIPTION

Figure 1:
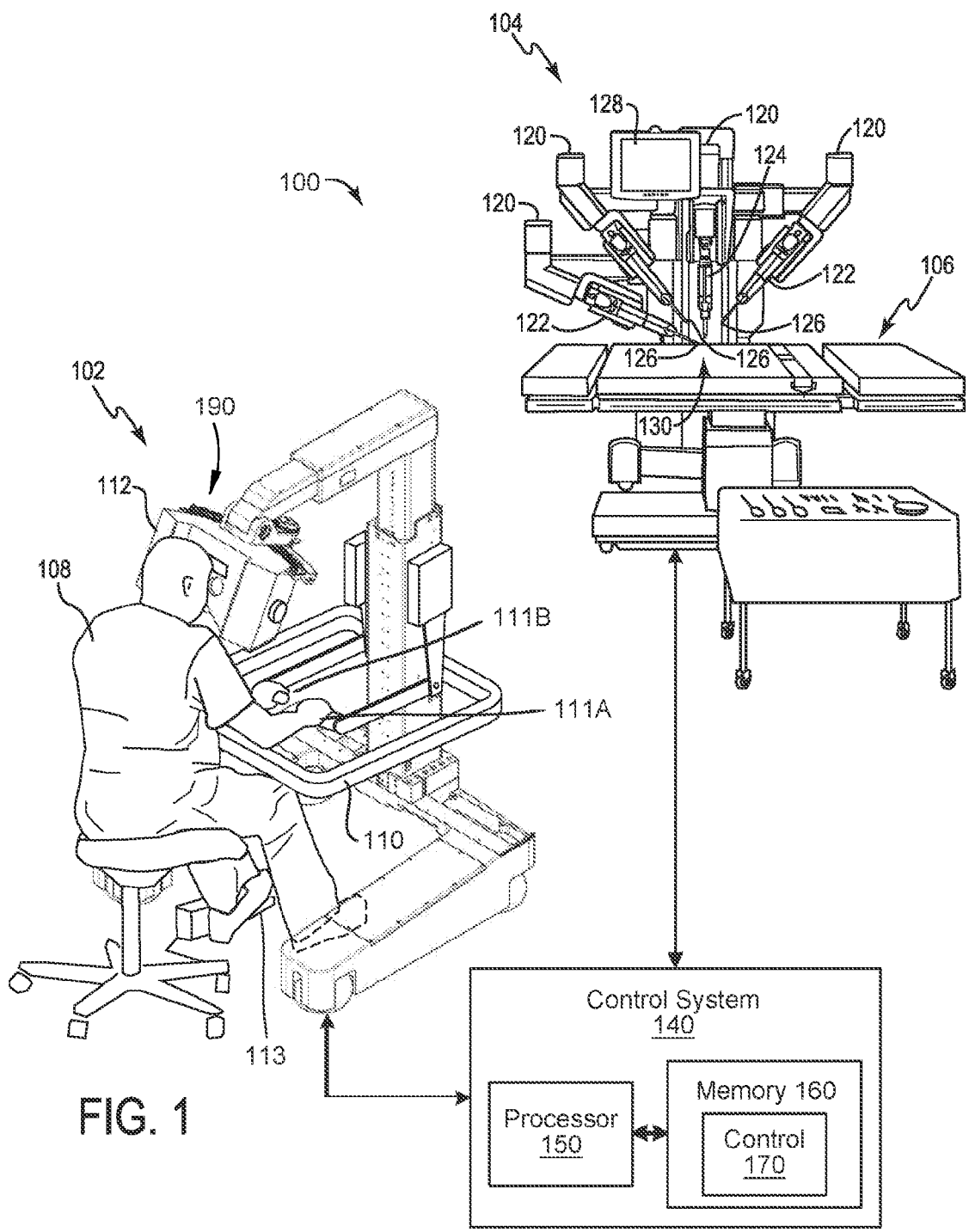
FIG. 1 is a simplified diagram of an example computer-assisted robotic system.

In one or more embodiments, systems and methods for providing reminders to an operator of a computer-assisted robotic system are presented. In one or more embodiments, the operator may cause the robotic system to enter a clutch mode, so as to allow repositioning of one or more input devices of an input system, for example, to a more convenient position, or to have a more comfortable orientation, or to prepare for a large move of one or more of the input devices, or some other reason. In the clutch mode, the input devices may be repositioned without moving robotic devices normally controlled by the one or more input devices. These input devices include a display unit, upon which the operator rests his or her head, and by which the operator may control the position and orientation of an imaging device. These input devices also include one or more hand input devices, by which the operator controls tools. In one or more embodiments, hand reminders may be provided based on one or more parameters. For example, in some instances, the reminder may be provided in response to the one or more parameters satisfying at least one condition for a reminder provision. In some instances, the at least one condition for the reminder provision comprises one or more conditions consistent with situations where the operator has forgotten to move, or otherwise has not moved (e.g., translated or rotated), a hand input device after having moved a display unit. The reminder may be a visual reminder, an audible reminder, a tactile (e.g. haptic feedback) reminder, or any combination thereof.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an embodiment using a surgical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic implementations. Embodiments described with reference to the da Vinci® Surgical System are merely exemplary and are not to be considered as limiting the scope of the inventive aspects disclosed herein. For example, techniques described with reference to surgical tools and surgical methods may be used in other contexts. Thus, the tools, systems, and methods described herein may be used for humans, animals, portions of human or animal anatomy, industrial systems, general robotic, or general teleoperated systems. As further examples, the tools, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

FIG. 1 is a simplified diagram of an example computer-assisted robotic system 100, according to various embodiments. In some examples, the computer-assisted robotic system 100 may be a teleoperated medical system. In some examples, the teleoperated medical system may be a surgical system. In some examples, the computer-assisted robotic system 100 may be operated in a leader-follower configuration. The leader-follower configuration is sometimes called a "master-slave" configuration. In a leader-follower configuration, the follower ("slave") mimics part or all of the leader's "master's" motion. An operator can then use the input system of the leader device to teleoperate the follower device. In this computer-assisted robotic system 100 example, as shown in FIG. 1, the computer-assisted robotic system 100 includes a follower device 104 and a leader device (for example, comprising an input system 102) for commanding motion of the follower device 104. In the example of FIG. 1, the follower device 104 is shown as a manipulating device comprising one or more manipulator arms 120, and the input system 102 of the leader device is shown with a workstation, in this case in the form of a console. The follower device 104 and leader device may be in any appropriate form; for example, in various instances, the follower device 104 may comprise any appropriate tele-operable system, and the input system 102 of the leader device and may or may not include a workstation.

In this example, the input system 102 of the leader device includes one or more input devices which are manipulated by the hands of an operator 108. For example, the input system 102 may comprise one or more hand input devices 111A, 111B for use by one or more hands of the operator. The hand input devices 111A, 111B are supported by the input system 102 and may be mechanically grounded. Additionally, for example, the input system 102 may comprise one or more foot input devices 113 for use by one or more feet of the operator. In various examples, an input device (111A, 111B, 113) is each usable by a single hand or foot, usable by or by multiple hands or feet simultaneously, and/or usable by multiple hands or feet in a time-multiplexed manner. Input devices (111A, 111B, 113) may each include, or be coupled mechanically, coupled electromagnetically, imagable by, or otherwise sensed by, one or more sensors (not shown) to detect operator interaction (e.g., application and release of foot input device 113). An ergonomic support 110 may be provided in some instances (e.g., a forearm rest on which the operator 108 may rest his or her forearms). In some examples, the operator 108 may perform tasks at a worksite with the follower device 104 during a procedure by commanding the follower device 104 using one or more of the input devices (111A, 111B, 113) of the leader device. The tasks, for example, may comprise part of a procedure; the procedure may be a non-medical a medical procedure.

Continuing with reference to FIG. 1, a display unit 112 is included in the example input system 102. The display unit 112 may display stored images, images obtained by an imaging device or another source, or other images for viewing by the operator 108. The display unit 112 may be moved in various degrees of freedom to accommodate the viewing position of the operator 108 and/or to provide control functions. In some examples, the display unit 112 accepts inputs from the operator 108 to command a display of images obtained by the imaging device of the computer assisted robotic system. For example, in some instances, the display unit 112 accepts head inputs, such as detected by head input sensor 190, from the operator 108 to command the displayed image by commanding motion of the follower device 104; in such an example, the display unit 112 is also an input device (a head input device) of input system 102, and is used in a leader-follower configuration. In another example, the display unit 112 accepts head inputs, such as detected by head input sensor 190, from the operator 108 to command the displayed image by causing a digital change to the image acquired by the follower device 104. The head input sensor 190 is utilized to sense the presence of the operator's head, and/or forces imparted by the head on the display unit 112, and/or torques imparted by the head to the display unit 112. The head input sensor 190 outputs signals based on the sensed head presence and contact forces/torques imparted by the head on the display unit 112. The outputted signals are used to infer movement of the operator's head when in contact with the display unit 112, and to generate the digital change to the image acquired by the follower device 104. Example digital changes to the displayed image include digital zooming, panning (e.g. by displaying only a portion of the acquired image and changing the portion displayed), tilting, rotating, or other view manipulation of the acquired image. Thus, in various instances, the change in the displayed image may be through only moving the imaging device, only digitally changing the image displayed, or a combination of moving the imaging device and digitally changing the image displayed.

In some instances, the head input sensor 190 or other sensors of the computer-assisted robotic system 100 (e.g. of the display unit 112, of components of the input system 102, etc.) are configured to provide sufficient sensor data to distinguish the head from other body parts, and/or to distinguish forces or torques imparted by the head on the display unit 112 from those imparted by other sources. The sensor data may directly indicate the head (e.g. from a head presence sensor, an image from which contact of the head input device by the head can be identified, etc.), or provide sufficient information such that interaction with the head can be inferred with sufficient certainty (e.g. indicate force or torque magnitudes, directions, or histories commensurate with head input, indicate that the operator's hands are engaged with hand input devices such that the input sensed by the head input device is not provided by the hands, etc.). In some instances, the control system 140 is configured to use such sensor data to identify head input signals attributable to interaction with the head, and use those identified head input signals in commanding the robotic system or providing reminders.

In some instances, the head input sensor 190 or other sensors of the computer-assisted robotic system 100 do not provide sufficient sensor data to distinguish the head from other body parts, or to distinguish forces or torques imparted by the head from those imparted by other sources. In some instances, the control system 140 lacks sufficient sensor data to identify, or is not configured to use sensor data to identify, head input signals attributable to interaction with the head. In these instances, the control system 140 may be configured to use the input signals resulting from input to the head input device, without identifying or distinguishing those caused by head interaction or removing those causes by interaction with other body parts, for commanding the robotic system or providing reminders.

Although head input sensor 190 is shown in FIG. 1 as a monolithic component in a particular location of display unit 112, the head input sensor 190 may comprise any appropriate number, size(s), shape(s), and location(s) of sensor element(s) utilizing any appropriate sensing technology. For example, head input sensor 190 may comprise one or more sensors located beneath a headrest of display unit 112. As other examples, head input sensor 190 may comprise one or more sensor elements integrated with or located within another portion of the display unit 112, be integrated within another part of display input system 102, be located separately from display input system 102, utilize contact (e.g., force, torque, strain, pressure, electrical resistance) or non-contact technology (e.g., optical, acoustic, ultrasonic, RF, etc.), and the like.

In the example of the computer-assisted robotic system 100, the display unit 112 may display images depicting a worksite at which the operator is performing various tasks by manipulating the input devices (e.g., 111A, 111B, 113, and as appropriate 112) to command a device such as a follower device. In some examples, the images displayed by the display unit 112 may be received by the input system 102 from one or more imaging devices for capturing images at the worksite. In other examples, the images displayed by the display unit 112 may be generated by the display unit 112 (or by another device or system communicatively coupled to the display unit), such as for virtual representations of tools, the worksite, user interface components, etc.

When using the input system 102, the operator 108 may sit in a chair, as shown, or on other support in front of the input system 102, position his or her eyes in front of the display unit 112, manipulate the input devices 111A, 111B, 113, and rest his or her forearms on the ergonomic support 110, as desired. In some instances, the operator 108 may stand at the input system 102 or assume other poses, and the display unit 112 and input devices 111A, 111B, 113 may be set at positions (height, depth, etc.) that accommodate a standing operator 108. In some instances, the operator 108 may sit or stand and the display unit 112 and input devices 111A, 111B, 113, and other components adjusted to accommodate the sitting or standing posture.

As noted above, the computer-assisted robotic system 100 may also include a follower device 104, which may be commanded by the leader device (for example, commanded by the input system 102). In a medical example, the follower device 104 may be located near an operating table 106 (e.g., a table, bed, or other support) on which a patient (or model or simulated patient) may be positioned. In such cases, the worksite 130 may be located on the operating table 106. The example follower device 104 as shown includes a plurality of manipulator arms 120, each manipulator arm 120 configured to couple to a tool assembly 122. A manipulator arm 120 may include, for example, a carriage or other tool interface for coupling to a tool 126.

In various instances, one or more of the tools 126 may include an imaging device for capturing images. Example imaging devices include optical cameras, infrared or ultraviolet cameras, hyperspectral cameras, ultrasonic sensors, etc. FIG. 1 shows an imaging device comprising an endoscope assembly 124. The imaging device may provide captured images of part or all of the worksite, to be displayed by the display unit 112 and/or other display units near or far from the worksite.

In some instances, the manipulator arms 120 may be controlled to move and articulate the tools 126 in response to manipulation of the hand input devices 111A, 111B by the operator 108, so that the operator 108 may perform tasks at the worksite 130 using the tools 126. In surgical examples, the operator 108 may direct the manipulator arms 120 to move tools 126 to perform surgical procedures at internal surgical sites through minimally invasive apertures or natural orifices of patients.

As shown, a control system 140 is provided external to the input system 102 that communicates with the input system 102. In other instances, the control system 140 may be provided in input system 102 or in follower device 104. As the operator 108 moves input device(s) (for example hand input devices 111A, 111B, and, as appropriate, a head input device comprising display unit 112) sensors sense spatial information, including sensed position and/or orientation information, and provide such spatial information to the control system 140 based on the movement of these input devices. The control system 140 may determine or provide control signals to the follower device 104 to control the movement of the manipulator arms 120, tool assemblies 122, and/or tools 126 based on the received information and operator input. In one instance, the control system 140 supports one or more fiber optic or other wired communication protocols, (e.g., Ethernet, USB, and/or the like) and/or one or more wireless communication protocols (e.g., Bluetooth, IrDA, HomeRF, IEEE 802.11, DECT, Wireless Telemetry, and/or the like).

The control system 140 may be implemented on one or more computing systems. One or more computing systems may be used to control the follower device 104. In addition, one or more computing systems may be used to control components of the input system 102, such as movement of the display unit 112 in response to movement of the head of the operator 108.

As shown, the control system 140 includes a processor 150 and a memory 160 storing a control module 170. In some instances, the control system 140 may include one or more processors, non-persistent storage (e.g., volatile memory, such as random access memory (RAM), cache memory, etc.), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. In addition, functionality of the control module 170 may be implemented in any technically feasible software and/or hardware. The control system 140 includes an operating system capable of hard real-time processing, a data acquisition interface for sampling digital and analog signals, and digital and analog outputs and power amplifiers for generating command signals, etc.

In some instances, one or more input devices 111A, 111B, 113 may be ungrounded (ungrounded input devices being not kinematically grounded, such as, for example, hand input devices held by the hands of the operator 108 without additional physical support). Such ungrounded input devices may be used in conjunction with the display unit 112. In some instances, the operator 108 may use a display unit 112 positioned near the worksite, such that the operator 108 may manually operate tools at the worksite, such as a laparoscopic tool in a surgical example, while viewing images displayed by the display unit 112.

Some instances may include one or more components of a computer-assisted robotic medical system such as a da Vinci® Surgical System, commercialized by Intuitive Surgical, Inc. of Sunnyvale, California, U.S.A. Embodiments on da Vinci® Surgical Systems are merely examples and are not to be considered as limiting the scope of the features disclosed herein. For example, different types of teleoperated systems having follower devices at worksites, as well as non-teleoperated systems, may make use of features described herein.

Figure 2:
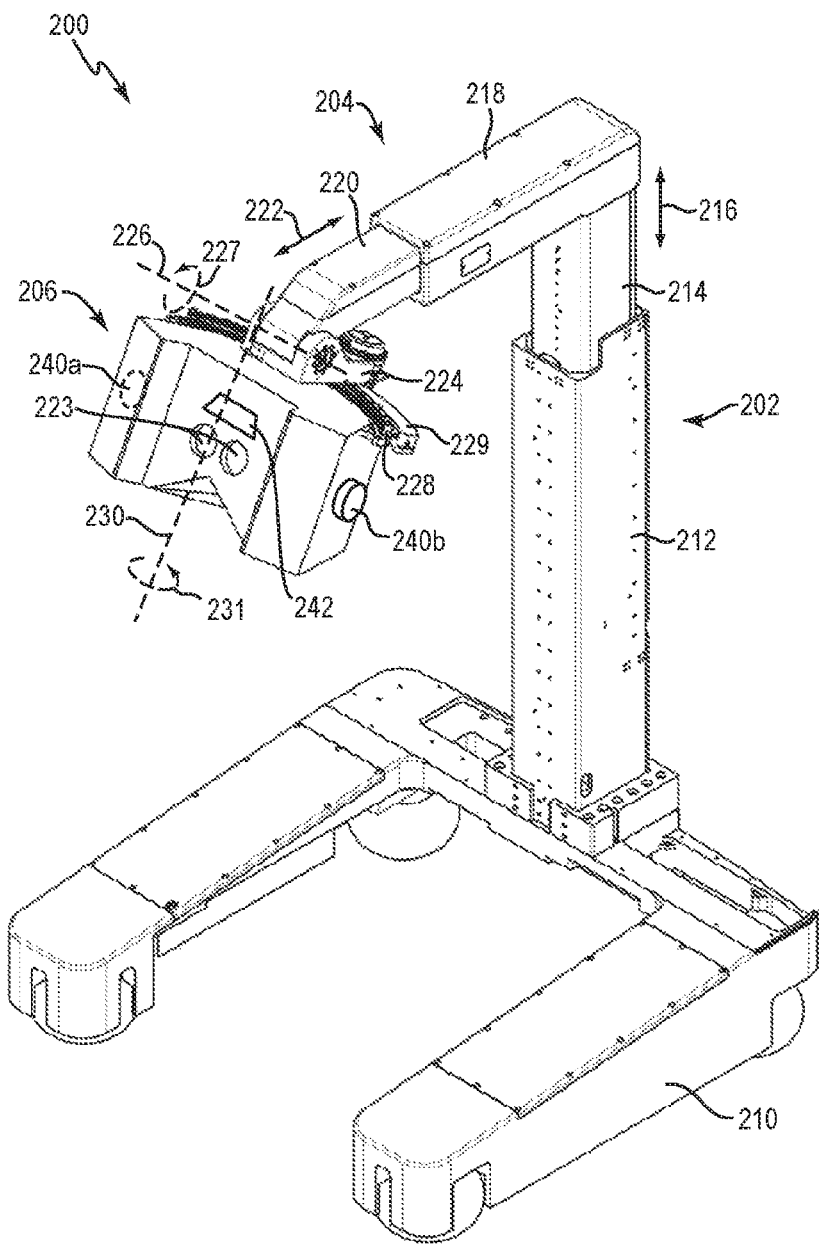
FIG. 2 is a perspective view of an example display system.

FIG. 2 is a perspective view of an example display system 200, in accordance with various instances. In some instances, the display system 200 is used in an input system of a computer-assisted robotic system (e.g., in input system 102 of the computer-assisted robotic system 100 of FIG. 1). In some instances, the display system 200 may be used in other systems or as a standalone system, e.g., to allow an operator to view a worksite or other physical site, a displayed virtual environment, or the like. Although FIG. 2 shows a specific configuration, other instances may use different configurations.

The display system 200 includes a base support 202, an arm support 204, and a display unit 206. The display unit 206 is provided with multiple degrees of freedom of movement provided by a support linkage including the base support 202, the arm support 204 coupled to the base support 202, and a pitch member 224 (described more fully below) coupled to the arm support 204. The display unit 206 is coupled to the pitch member 224.

The base support 202 may be a vertical member that is mechanically grounded, e.g., directly or indirectly coupled to ground, such as by resting or being attached to a floor. For example, the base support 202 may be mechanically coupled to a support structure 210 that is coupled to the ground. The base support 202 includes a first base portion 212 and a second base portion 214 coupled such that the second base portion 214 is translatable with respect to the first base portion 212 in a linear degree of freedom. In one example, as shown in FIG. 2, the second base portion 214 is configured to fit within first base portion 212, and to move up and down relative to it, along the degree of freedom 216, shown in FIG. 2 as generally a vertical direction.

The arm support 204 may be a horizontal member that is mechanically coupled to the base support 202. The arm support 204 may include a first arm portion 218 and a second arm portion 220. The second arm portion 220 is coupled to the first arm portion 218 such that the second arm portion 220 is linearly translatable in a first linear degree of freedom (DOF) with respect to the first arm portion 218. In one example, as shown in FIG. 2, the second arm portion 220 is configured to fit within first arm portion 218, and to move forwards and backwards relative to it, along the degree of freedom 222, shown in FIG. 2 as generally a horizontal direction.

The display unit 206 may be mechanically coupled to the arm support 204. The display unit 206 may be moveable in a second linear DOF provided by the linear translation of the second base portion 214 and second arm portion 220.

In some instances, the display unit 206 includes a display device, e.g., one or more display screens, projectors, or other display devices, that may display digital images. The display unit 206 may include two viewports 223, where the display device is provided behind or included in the viewports. One or more display screens or other display devices may be positioned on the display unit 206 in place of the viewports 223 in some instances.

In some instances, the display unit 206 displays images of a worksite (e.g., an interior anatomy of a patient in a medical example), captured by an imaging device such as an endoscope. The worksite may alternatively be a virtual representation of a worksite. The displayed images may show captured images or virtual renderings of tools 126 of the follower device 104 while one or more of these tools 126 are controlled by the operator via the input devices of the input system 102.

In some instances, the display unit 206 is rotationally coupled to the arm support 204 by a pitch member 224. In the illustrated example, the pitch member 224 is coupled at a first end to the second arm portion 220 of the arm support 204 by a rotary coupling configured to provide rotational motion of the pitch member 224 and the display unit 206 about a pitch axis 226 with respect to the second arm portion 220. For example, this rotation may be vertical or top-down rotation from the point of view of an operator viewing images of the display unit 206 via the viewports 223. In some instances, the pitch axis 226 is positioned above the display device in the display unit 206, as shown in FIG. 2.

Each of the various degrees of freedom discussed herein may be passive and require manual manipulation, or be movable by one or more actuators, such as by one or more motors, solenoids, etc. For example, the rotational motion of the pitch member 224 and the display unit 206 about the axis 226 may be driven by one or more actuators, such as by a motor coupled to the pitch member at or near the pitch axis 226.

The display unit 206 may be rotationally coupled to the pitch member 224 and may rotate about a yaw axis 230. For example, this may be lateral or left-right rotation from the point of view of an operator viewing images of the display unit 206 via the viewports 223. In this example, the display unit 206 is coupled to the pitch member by a rotary mechanism which may be a track mechanism. For example, in some instances, the track mechanism includes a curved track 228 that slidably engages a groove member 229 coupled to the pitch member 224, allowing the display unit 206 to rotate about the yaw axis 230 by moving the curved track 228 through a groove of the groove member 229.

The display system 200 may thus provide the display unit 206 with a vertical linear degree of freedom 216, a horizontal linear degree of freedom 222, a rotational (pitch) degree of freedom 227, and a rotational yaw degree of freedom 231. A combination of coordinated movement of components of the display system 200 in these degrees of freedom allow the display unit 206 to be positioned at various positions and orientations in its workspace. The motion of the display unit 206 in the pitch, horizontal, and vertical degrees of freedom allows the display unit 206 to stay close to, or maintain contact with, the head of the operator when the operator is providing head input(s) through forces, torques, or motion sensed by the head input sensor 190.

The degrees of freedom of the display system allow the display system 200 to provide pivoting motion of the display unit 206 in physical space about a pivot axis that may be positioned in different locations. For example, the display system 200 may provide motion of the display unit 206 in physical space that corresponds to motion of a head of an operator when operating the display system 200.

The display unit 206 may include one or more input devices that allow an operator to provide input to manipulate the orientation and/or position of the display unit 206 in space, and/or to manipulate other functions or components of the display system 200 and/or a larger system, e.g., the computer-assisted robotic system 100.

Illustratively, a head input device 290 of the display unit 206 includes a headrest portion 242 for contacting the head of the operator. The headrest portion 242 may be located in a region above the viewports 223 so as to be in contact with the forehead of the operator while the operator is viewing images through the viewports 223. The display unit 206 may include one or more head input sensors configured to sense operator head input to the display unit 206, such as forces applied to the headrest portion 242. These inputs sensed by the head input sensor(s), or head inputs, may be interpreted by the control system as commands to cause movement of the imaging device or other tool, or otherwise cause updating the view in the images displayed on the display unit 206 and presented to the operator (such as by graphical rendering, digital zooming or panning, etc.). In some examples, one or more head input sensors may be provided underneath headrest portion 242. In alternate examples, the head input sensors may be integrated within another portion of the display unit 206, be integrated within another part of display system 200 (such as by comprising joint sensors of the display system 200), and the like. Further, in some instances and some instances of operation, the sensed head movement is used to move the display unit 206 to compensate for the head movement. The position of the head of the operator may, thus, remain stationary relative to the viewports 223, even when the operator performs head movements that cause motion of the display unit 206 and controls the view provided by the imaging device.

The one or more head input sensors may include any of a variety of types of sensors, e.g., resistance sensors, capacitive sensors, force sensors, pressure sensors, optical sensors such as optical cameras, joint encoders, strain gauges, other sensors enumerated elsewhere in this disclosure, etc.

Continuing with reference to FIG. 2, the orientation and/or position of the display unit 206 may be changed by the display system 200 based on the operator head input. For example, sensed head operator input is provided to a control system (e.g., the control system 140 shown in FIG. 1), which controls actuators of the display system 200 to move the second base portion 214 in linear degree of freedom 216, the second arm portion 220 in linear degree of freedom 222, pitch member 224 in rotary degree of freedom 227, and/or display unit 206 in rotary degree of freedom 231, to cause the display unit 206 to be moved as commanded by (e.g., in accordance with) the sensed operator head input. Sensed operator head input may also be used to control other functions of the display system 200 and/or of a larger system (e.g., computer-assisted robotic system 100 of FIG. 1). Thus, in some instances, the operator may move his or her head to provide input to input device to control the display unit 206 to be moved by the display system 200 in accordance with the motion of the head, thus allowing the display unit 206 to follow motions of the head of the operator and changes in viewing angle.

In some instances, images displayed by the display unit 206, and/or other controlled devices, are changed and manipulated based on the sensed motion of the display unit 206.

In some instances of a display system, the display unit 206 has degrees of freedom that differ in number, range of motion, direction of motion, etc. In some instances, the display unit 206 is rotatable about yaw axis 230 in degree of freedom 231. In some instances, the display unit 206 lacks one or more of the following degrees of freedom: 216, 222, and 227. As a specific example, a display unit 206 may have degrees of freedom 231, 216, and lack degree of freedoms 222 and 227.

Those skilled in the art will appreciate that FIG. 2 merely shows an example for a configuration of a display system. Alternative configurations supporting movement of the display unit 206 based on an input from the operator are also possible. Any repositionable structure configuration that supports the desired movements of the display unit 206 may be used in lieu of the configuration shown in FIG. 2.

FIG. 2 illustrates a display unit 206 that is part of a grounded mechanical structure (e.g., the display system 200). In other instances, the display unit may be any technically feasible display device or devices. For example, the display unit could be a handheld device, such as a tablet device or mobile phone that is held by an operator. As another example, the display unit could be a head-mounted device (e.g., glasses, goggles, helmets). The position and/or orientation of the display unit may be determined using one or more accelerometers, gyroscopes, inertial measurement units, cameras, or other sensors internal or external to the display unit.

As described, the head input device 290 and headrest portion 242 in a display unit (e.g., the display unit 206) can include one or more head input sensors that sense operator head input that is converted to commands to cause movement of an imaging device. For example, the head input device 290 can capture and convert head input provided by head forces or movements to commands for a tool, such as a tool comprising an imaging device. In an example where the tool comprises an endoscope assembly (e.g., endoscope assembly 124), the endoscope assembly may capture and provide images of a portion of a worksite that is displayed for output via the display unit 206.

Figure 3:
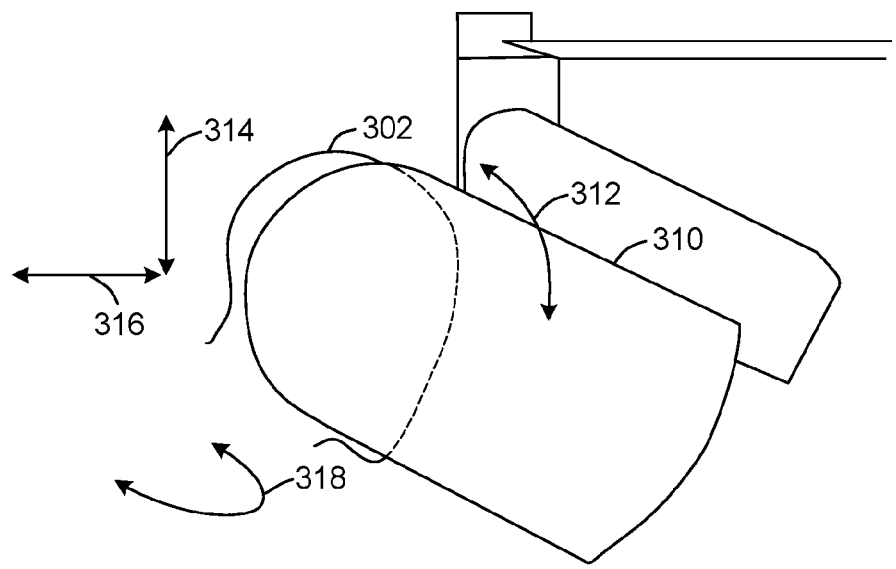
FIG. 3 illustrates different degrees of freedom of an example display unit.

FIG. 3 illustrates degrees of freedom of an example display unit, in accordance with various examples. In various examples, a display unit may have different degrees of freedom than that of a tool that it commands. FIG. 3 illustrates an example display unit 310 that can correspond to the display unit 112 of FIG. 1 and the display unit 206 of FIG. 2. The example display unit 310 includes four DOFs. In particular, the display unit 310 can move along a vertical axis, in a vertical (up and down) DOF 314, and along a horizontal axis, in a horizontal (forward and back) DOF 316. The display unit 310 can further rotate the display unit 310 about a vertical axis, in a yaw DOF 318, and rotate about a horizontal axis, in a pitch DOF 312. For example, corresponding to the display system described in conjunction with FIG. 2, the orientation and/or position of the display unit 206 may be changed based on operator input to manually move the display unit 206, or to control actuators of the display system 200 to move the display unit 206. For example, the manual or actuator-provided movement can follow the movement of the head of an operator by moving the second base portion 214 in linear degree of freedom 216, the second arm portion 220 in linear degree of freedom 222, the pitch member 224 in rotary degree of freedom 227, and/or the display unit 206 in rotary degree of freedom 231.

Similarly, an example hand input device may have different degrees of freedom than that of a tool that it commands. In various examples, a hand input device may have the same four DOFs illustrated for the display unit 310 in FIG. 3. In other examples, such as hand input devices 111A and 111B shown in FIG. 1, a hand input device may lack a pitch DOF that is analogous to DOF 312 of FIG. 3. In still other examples, a hand input device may have an additional leftward-rightward (side-to side) horizontal DOF, along a second horizontal axis. This additional leftward-rightward DOF is perpendicular to each of vertical DOF 314 and horizontal DOF 316 of FIG. 3. The additional horizontal DOF allows an operator to move a hand input device along a direction parallel to the width of ergonomic support 110. In various examples, the hand input devices (e.g., hand input devices 111A and 111B) and the head input device (e.g., a display unit 112, 206, 310 appropriately configured) are all moveable independently of each other, and therefore are each in their own workspace.

In some computer assisted robotic systems, there may be multiple operational modes for controlling an imaging device that is coupled to the follower device (e.g., follower device 104). In an example operational mode, the imaging device is controlled by the operator manipulating one or more hand input devices of the leader device (for example, one or both of hand input devices 111A and 111B of FIG. 1). However, in this operational mode, the imaging device cannot easily be moved while one or both of the operator's hands (or one or more of the hand input devices) are being used to perform other tasks. Examples of other tasks include, for example, manipulating one or more hand input devices to command one or more tools coupled to a follower device. In an alternate operational mode, the operator controls an imaging device by providing commands using his or her head, such as by providing non-contact head input (e.g., head motion tracked by cameras or other sensors) or by providing contact-based head input (e.g., linear force, or rotational force (may also be called "torque"), linear displacement, or angular displacement applied by the head). Controlling the imaging device using head inputs can allow the operator more options in using his or her hands to perform other tasks. In some instances, entry and/or exit from this alternate operational mode is also achieved while requiring little or no use of the operator's hands; such an approach can leave the operator's hands available for more options and improved control. This alternate operational mode is sometimes known as a "Head Control Mode" ("HCM"). In some examples, a computer-assisted robotic system (e.g., robotic system 100) may be configured to operate in multiple operational modes, where a first operational mode involves the use of one or more hand input devices to control the motion of the imaging device, and a second operational mode involves little or no use of hand input devices for controlling the motion imaging device. In other examples, a computer-assisted robotic system may be configured to operate in only the HCM.

While using a robotic system (e.g., robotic system 100) in the HCM, the operator may want to move an input device (e.g. head, hand, foot, or other input device) without commanding the movement of any tools corresponding to such input device. This may be to position the input device with sufficient range of motion for a command for a larger move, to move the input device to a more comfortable position, to move the input device to a more away from a range of motion limit, and/or some other reason. In an example, the robotic system (e.g., robotic system 100) has a clutch functionality (known as "clutch mode") that temporarily suspends hand and/or head motion controls of the robotic system. In some instances, the system enters the clutch mode by a control system 140 of the system operating in a manner consistent with the clutch mode (e.g., not commanding follower motion in response to input device motion, etc.). With the system in clutch mode, the operator can move the head and hand input devices without causing motion commanded by the input devices of corresponding tool(s) (e.g.

the imaging device or other tool). In some instances, the control system 140 is configured with separate head and hand clutch modes. With the system in head clutch mode, the operator can move the head input device without causing commanded motion of the corresponding tool (e.g., an imaging device). In some examples, the system 100 in head clutch mode allows the head input device to move without causing commanded a change in the image displayed by the display unit by decoupling the corresponding imaging device or displayed view from the motion of the head input device. Additionally with the system in a hand clutch mode, the operator can move a hand input device without causing commanded motion of the corresponding tool (e.g., a manipulation or cutting tool). Thus, for example, once the system has entered a clutch mode, the operator may, without causing commanded motion that changes the position of tools coupled to the follower device (e.g. imaging devices or other tools), move the head or hand input device(s) to positions allowing large move commands, to more comfortable positions, away from range of motion limits, etc. In some instances, the operator may move the head or hand input device to the operator's "home position." The home position may be an initial position for the start of a task or procedure, an ergonomically favorable position for the operator, etc. In some instances, the robotic system in a clutch mode provides a visual indicator designed to guide an operator to move his or her head or hand(s), such as to or towards the home position or some other position. Once the input device positioning is complete, the system may exit the clutch mode automatically or at a command or other indication of the operator. The system may also enter a teleoperation mode (e.g., a Head Control Mode (HCM)) automatically or at a command of the operator.

In some cases, the operator moves the head input device but forgets to move or otherwise does not move, or delays moving, one or more hand input devices. In some cases, the operator moves one or more hand input devices, but forgets to move or otherwise does not move, or delays moving, the head input device. Thus, to aid the operator in using one or more of these input devices in a clutch mode, the system may provide one or more feedback cues that remind or encourage the operator to move the head and/or hand input devices as applicable.

The discussion herein largely focuses on the positions, orientations, and/or motions, of the head and hand input devices. In many such instances, the positions, orientations, and/or motions of the head and hand input devices are indicative of the actual positions, orientations, and/or motions of the operator's head and hands, respectively. For example, a position, orientation, or motion of a head input device configured to be operated through contact with the operator's forehead can indicate a linear or angular position or linear or angular motion of the operator's head. As another example, a position, orientation, or motion of a hand input device configured to be operated while being grasped by the operator's hand can indicate a linear or angular position or linear or angular motion of the hand. Some systems are configured to directly sense, and use as input, the head and/or hands of the operator (e.g., by tracking the head and hand with contactless sensors such as optical or infrared cameras). Some systems are configured to indirectly sense, and use as input, the head and/or hands of the operator (e.g., by determining the head and hand motions that correspond to the motions of the head and hand input devices). The techniques described herein for providing reminders can be used by those systems as well, and applied to the head and/or hands instead of head and/or hand input devices. For example, the system may lack input devices that physically interact with the head or hands, and may provide reminders to move the head and/or hands instead of head and/or hand input devices.

Accordingly, in one or more instances, to help the operator reposition the head and/or hand input devices in the clutch mode, the system uses the display unit to conditionally present a reminder. For example, in some instances, a hand reminder to move one or more hands input devices is presented if it is determined that: the head input device has been moved substantially during clutch, the hand input devices have not been moved substantially during clutch, or the head input device has moved substantially while one or more hand input devices have not moved substantially. In some instances, the reminder may be visual, aural, tactile, or a combination of the foregoing (e.g., both visual and via some other sense, such as auditory or tactile). In some instances, the reminder is visual. In some instances, the visual reminder is rendered to appear to float above the scene depicted on a display screen (e.g., the display unit 112). In some instances, a visual reminder may be highlighted, change size or shape, large relative to the displayed image, or change in visual depiction (e.g., pulse, change in size or shape or color, etc.) to be of higher visibility. In other instances, the reminder contains auditory and/or tactile aspects instead of, or in addition to, visual aspects. Although some examples described herein utilize a particular type of reminder, it is contemplated that another type of reminder may be utilized alternatively or in addition to the type of reminder described in the illustrative example.

In some instances, the reminder may be provided to the operator based on one or more parameters derived from signals received from a head input device (e.g., a display unit 112, 206, 310, that is configured as an input device with proper instrumentation) and/or one or more hand input devices. In some such instances, once the parameters no longer indicate that a reminder is to be provided, the system may make the hand reminder less noticeable (such as by making the reminder less visible, smaller, more similar to the rest of the image, more translucent, softer or quieter sound, reduced magnitude or frequency of haptic feedback etc.) or completely stop providing the reminder. For example, in some instances, the operator moving one or both of the hand input devices away from their initial positions and/or orientations at the entry to the clutch mode by a determined amount changes the parameters to no longer indicate that a hand reminder is to be provided.

In some instances, even though the parameters otherwise indicate that the reminder should be provided, the system may nonetheless refrain from providing the reminder (or cease providing the reminder) in response to certain operational context, such as the occurrence of certain events. For example, in some instances, the robotic system may refrain from displaying the hand reminder (or cease providing the hand reminder) in response to operational context or events consistent with the operator intentionally moving the display unit (and not the hand input device(s)), with the operator positioning for a large move of the display unit, or otherwise with the operator not having forgotten to move the hand input device(s).

Figure 4A:
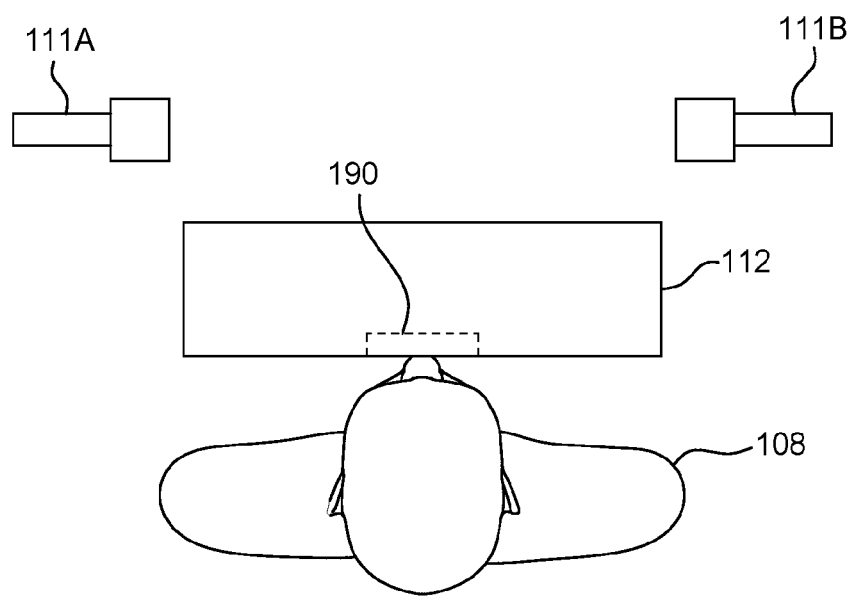
FIG. 4A illustrates a schematic top view of a head input device and two hand input devices of an example input system of a computer-assisted robotic system, each in a first position.

FIG. 4A illustrates a schematic top view of three input devices (a display unit 112 comprising a head input device, and two hand input devices 111A, 111B) of an example input system of a computer-assisted robotic system, each input device in a first position. For example, with reference to FIG. 1, the input system may be input system 102, and the depicted devices may be display unit 112 configured with head input sensor 190, and hand input devices 111A and 111B. The viewpoint of FIG. 4A is from above input system 102, with a top view (a two-dimensional (2D) projection) of the three input devices within a three-dimensional (3D) operating environment for the operator. Moreover, in the illustrated first position of the display unit 112 and the hand input devices 111A and 111B of FIG. 4A, these three devices are centered in respective workspaces for these input devices 111A, 111B, 112. In some instances, the centered positions serve as the operator's home positions for these devices. A schematic representation of orientation of the operator 108 relative to the input devices 111A, 111B, 112 is illustrated in FIG. 4A, with the forehead of the operator 108 shown engaged with the display unit 112 and detectable by head input sensor 190.

Figure 4B:
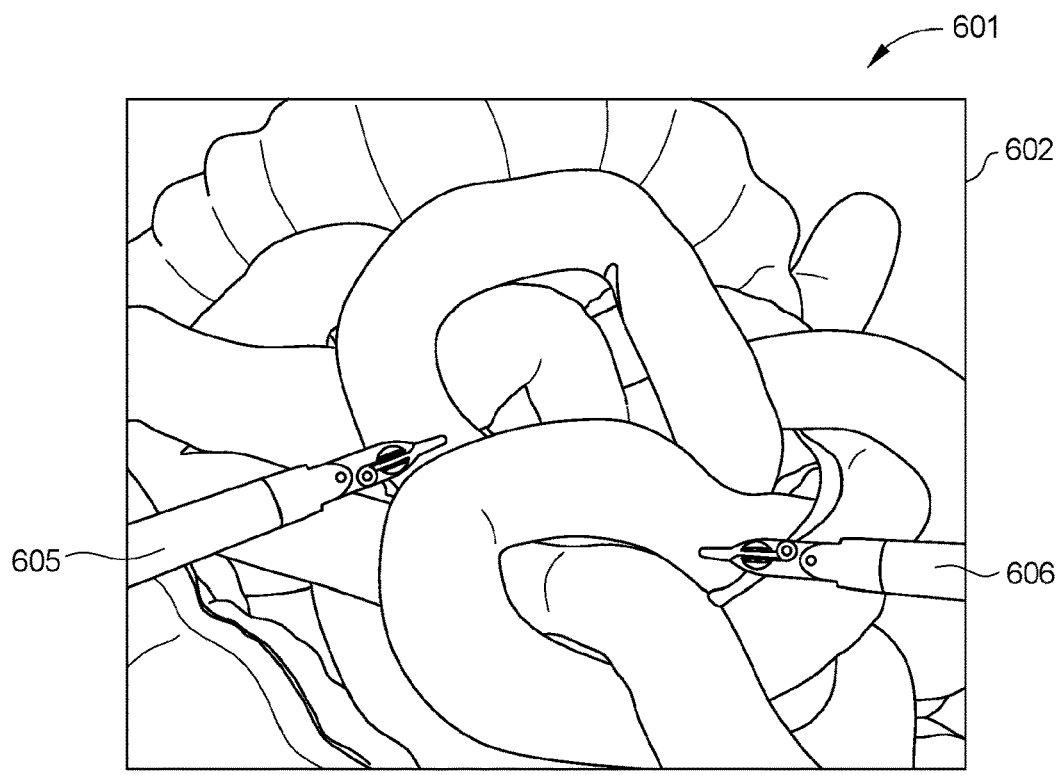
FIG. 4B depicts an example image as presented by an example display unit of an example input system.

FIG. 4B depicts a medical example that can correspond to FIG. 4A. In FIG. 4B, an image 601 of a worksite (an abdominal region including intestines is shown) captured by an imaging device (e.g., an endoscope) coupled at a follower device is displayed on a display unit at a leader device (for example, on display unit 112 of FIG. 1). As noted above, in the HCM, the position and/or orientation of the display unit can be used to control the position and/or orientation of the imaging device. Also visible in image 601 are two other tools, 605 and 606, which may be controlled by other input devices at the leader device, such as by hand input devices (e.g., hand input devices 111A and 111B of FIG. 1, respectively). In general, such other tools that an operator is using to operate with at a worksite are viewable by the imaging device at that worksite (e.g., these other tools are moveable and/or the imaging devices is moveable or zoomable such that these other tools can be visible within the field of view of the imaging device).

In examples that relate to procedures in multiple parts of a worksite, such as certain procedures on the intestines shown in FIG. 4B, an operator may need to move the imaging device to pan and/or zoom relative to different parts of the structure. For example, with reference to FIG. 4B, the operator may decide to pan and zoom the image to focus on the lower left quadrant of image 601. In some instances, the robotic system commands the follower device to move the imaging device in a manner that corresponds to the motion of the display unit 112. In this example, the operator can move the display unit 112 relative to himself/herself— translate the display unit 112 leftward and rotate the display unit 112 downward (e.g., along degree of freedom 312 as shown in FIG. 3). The operator may also zoom in or out, such as by moving the display unit forward or backward (e.g., along degree of freedom 316 as shown in FIG. 3). The operator may move hand input devices 111A and 111B within their respective workspaces, such as to bring the tools to within the post-movement field of view of the imaging device worksite. After such motions, the operator may choose to enter clutch mode to move the display unit 112 and/or the hand input devices 111A and 111B without commanding motion of the imaging device or the other tools. This may be for any of the reasons noted above, including that the display unit 112 and/or the hand input devices 111A and 111B may be in less optimal positions or orientations for the operator or the procedure, such as at or near an edge of their respective workspaces.

FIG. 4B also depicts an outline 602, superimposed on the displayed image, to indicate a recent viewpoint. For example, the outline 602 facilitates the operator returning to his/her previous viewpoint. In some instances, outline 602 may correspond to a previous position, a saved position, the operator's home position, or some other position, such that when the operator moves the head input device to move the imaging device to the indicated viewpoint, the operator's head also moves toward such position.

Figure 4C:
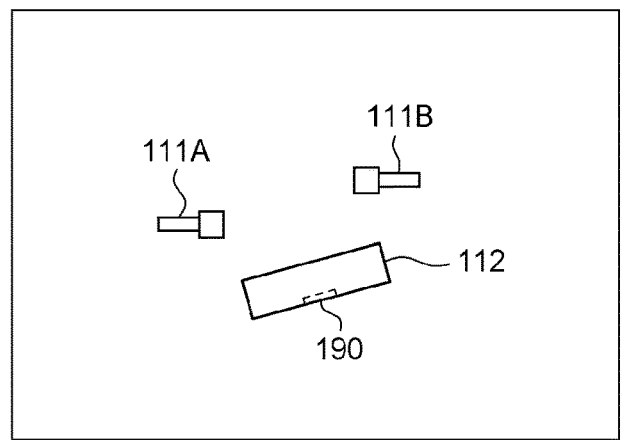
FIG. 4C illustrates the head input device and two hand input devices of FIG. 4A, each in a second position compared to FIG. 4A.

FIG. 4C illustrates a situation where the display unit 112 (also a head input device in this example) has translated and rotated relative to its pose shown in FIG. 4A, and the two hand input devices 111A and 111B have moved from their positions shown in FIG. 4A Moving the hand input devices 111A, 111B, and display unit 112 from their respective poses illustrated from FIG. 4A to those illustrated in FIG. 4C involves the operator translating and rotating the head toward the left relative to the operator, and extending both arms forward and toward the left relative to the operator. For example, the operator may move the display unit 112 and the hand input devices 111A, 111B from the pose shown in FIG. 4A to the pose shown in FIG. 4C to zoom in on the lower left portion of the image shown in FIG. 4B, and to locate the tools commanded by the hand input devices 111A, 111B to within the field of the view of the imaging device. The operator may cause the system to enter the clutch mode, and reposition the display unit 112 and/or one or more of the hand input devices 111A, 111B for any reason, including the reasons discussed above for clutch mode movements.

Figure 5:
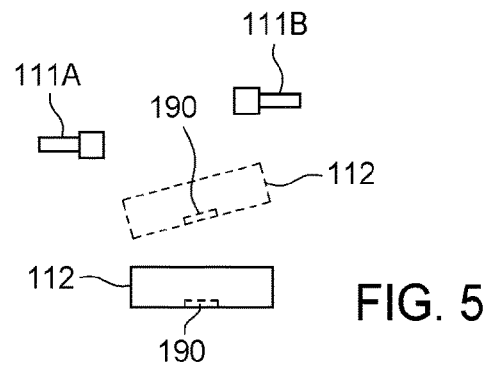
FIG. 5 illustrates the head input device and two hand input devices of FIG. 4C after the control system has entered a clutch mode of the computer-assisted robotic system.

FIG. 5 illustrates an example situation after entry into the clutch mode and repositioning (in this case, including both translating and rotating) the display unit 112 from the dotted-line depiction of the display unit 112 to the solid-line depiction of the display unit 112. In this example, at the time of entry into the clutch mode, the three input devices 111A, 111B, 112 were positioned and oriented in their respective workspaces as shown in FIG. 4C. As shown in FIG. 5, the operator has translated the display unit 112 rearward and rotated display unit 112 rightward, to within a small tolerance of, and essentially the same as, the pose that display unit 112 had in FIG. 4A. As shown in FIG. 5, the operator has not moved the two hand input devices 111A and 111B from where they were when the clutch mode was entered. In some instances, the system will provide a hand reminder to remind and encourage the operator to reposition one or both of the hand input devices 111A and 111B into potentially more desirable positions and/or orientations.

Figure 6A:
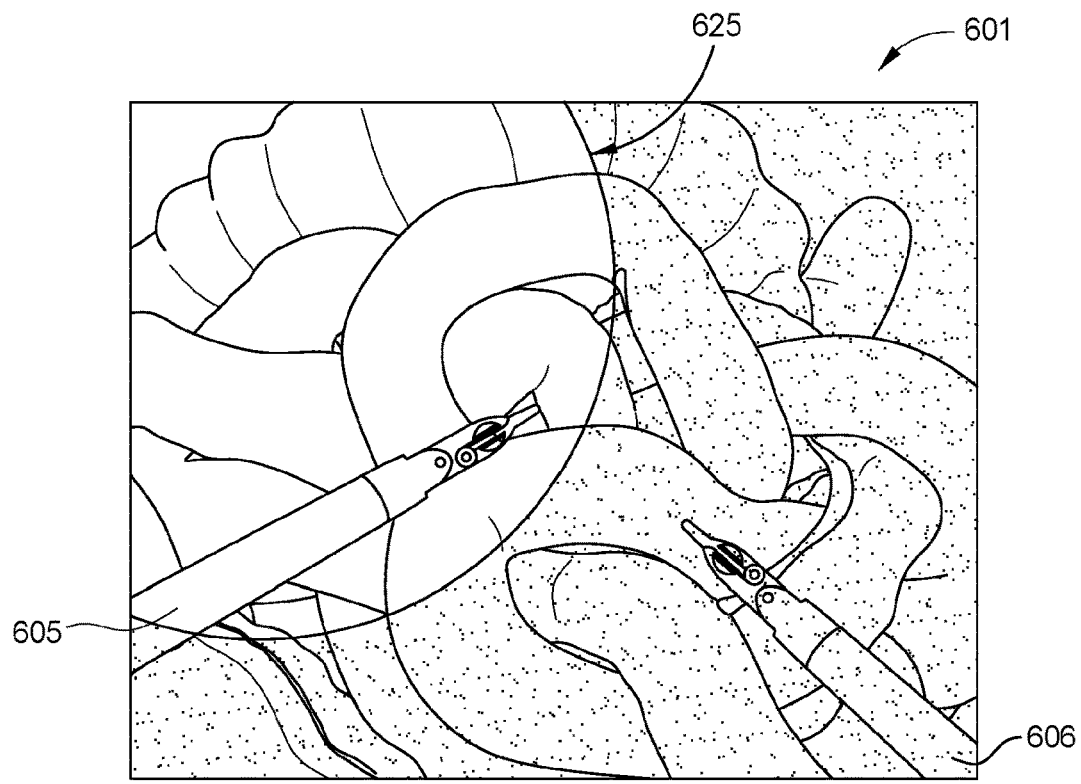
FIG. 6A illustrates an example visual indication provided in clutch mode.
Figure 6B:
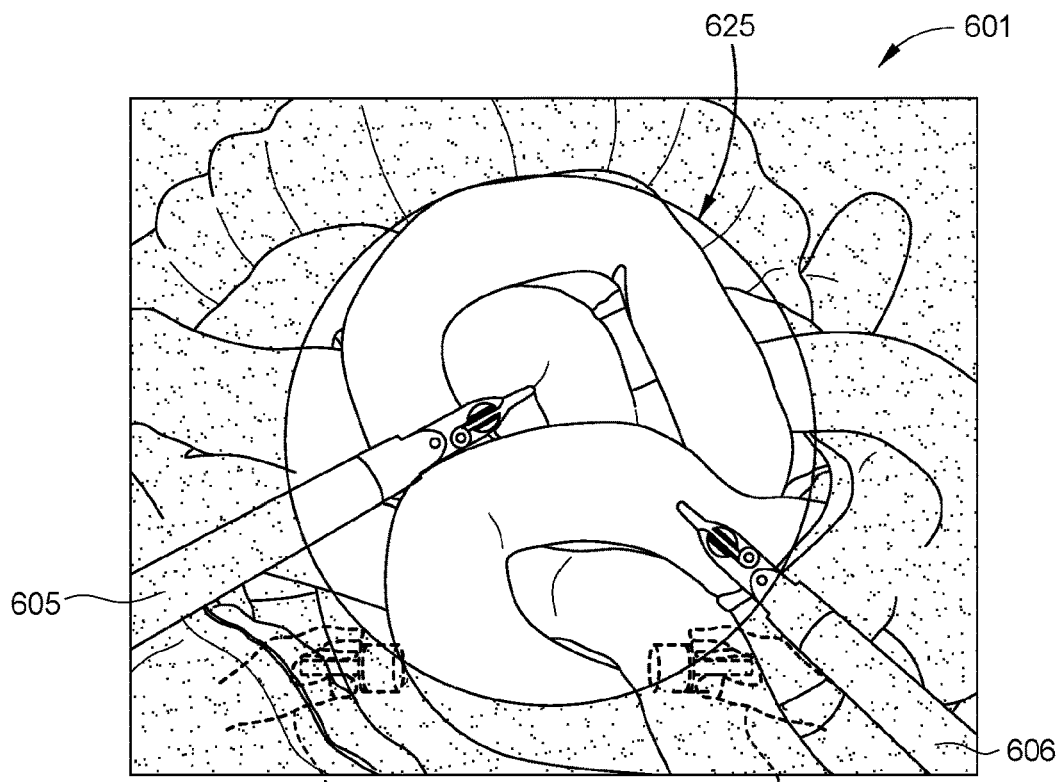
FIG. 6B illustrates the example visual indication after the operator has moved his or her head to or towards a previous position.

FIG. 6A illustrates an example head pose indicator that is implemented as an illuminated region 625. FIG. 6B illustrates, in addition to the illuminated region 625, a visual hand reminder 610 is displayed using the display unit 112. These figures are next described.

FIG. 6A illustrates an example image displayed by the display unit 112 after a computer-assisted robotic system has entered clutch mode. FIG. 6A illustrates that, following entry into the clutch mode, the imaging device image no longer moves in response to movement of the display unit 112 because control of the motion of the imaging device by the display unit 112 has been suspended. In some instances, the image displayed by the display unit 112 to the operator throughout clutch mode remains the same as displayed when the clutch mode was entered. FIG. 6A also illustrates that, in some instances, the displayed image provides a visual head pose indicator that reflects the position and orientation of the display unit 112 within the display unit 112's workspace. In the example of FIG. 6A, the head pose indicator is an illuminated region 625 that simulates the effect of a light beam. Although shown as circular, the illuminated region may be of any appropriate shape or size. The illuminated region 625 (especially if circular) may thus be understood as a metaphor of wearing a headlamp and using it to illuminate the endoscopic view. Outside of illuminated region 625, the image is not fully illuminated, and thus appears darker. In one or more instances, the angular offset of the illuminated region 625 relative to a center of the displayed image indicates the orientation of the display unit 112, and the illuminated region 625 size indicates a position of the display unit 112 relative to a reference position. In some instances, the location and size (e.g., area of coverage or a characteristic dimension such as a diameter for a circular region) of the illuminated region 625 may be determined so that the illuminated region 625 will mostly fill the displayed image when the operator's head is near a previous position (e.g., a position at entry into the clutch mode, a home position, etc.).

As shown in FIG. 6A, within the view of illuminated region 625 is a tool 605. The motion of the tool 605 was controlled by hand input device 111A when the system 100 was in the teleoperation mode. However, the motion of the tool 605 is now decoupled from hand input device 111A due to the system 100 being in the clutch mode. In the example of FIG. 6A, illuminated region 625 indicates that the operator's head (or the head input device) is upwards and leftwards of the previous position.

In one or more instances, independently or in addition to a head pose indicator, the display unit 112 may provide one or more visual or other type of hand reminders to move one or both of the operator's hands.

The head pose indicator, the visual hand reminder(s), and other visual indicator may be rendered to be at a depth within the displayed image 601, or appear to "float" above a view of the worksite. The view of the worksite may be live, and continue to show the images acquired by the imaging device, be a snapshot taken before entry into the clutch mode, be a virtual depiction, a hybrid, or any other appropriate image including a blank image or an image unassociated with the procedure.

An example visual hand reminder is shown in FIG. 6B. FIG. 6B shows the image displayed by the display unit 112 after the operator has moved his/her head rearward and to the right from its position in FIG. 6A. Thus, the illuminated region 625 is now at or near the center of the image, and thus near the previous position. Additionally, in FIG. 6B, the illuminated region 625 is positioned such that tools 605 and 606 are both partially illuminated. The example of FIG. 6B reflects a situation similar to that depicted in FIG. 5, where the operator has moved his/her head (or the head input device), but has not moved his/her hands after entering the clutch mode. Accordingly, in one or more instances, the computer-assisted robotic system may provide one or more hand reminders (e.g. hand reminders 610 and 611) to remind the operator to move his/her hand(s) (or hand input device) while in clutch mode. The hand reminder(s) may comprise any appropriate reminder, including any visual reminders comprising one or more textual, graphical, symbolic, icons, or other elements. In the example shown in FIG. 6B, the hand reminders 610, 611 comprise line drawings of hands holding parts of hand input devices (e.g. hand input devices 111A and 111B), as shown in FIG. 1. Other examples of hand reminders 610 and 611 include images of hands, hand input devices, etc.

As noted above, in one or more instances a control system 140 communicatively coupled to the head input device and to the hand input device of a computer-assisted robotic system may operate in a plurality of modes. In a first mode, the first mode being a type of teleoperation mode, the control system 140 commands a first tool within a worksite based on received head input signals, the first tool including an imaging device. In the first mode, the control system 140 may further command a second tool, such as tool 605 or 606, within the worksite based on received hand input signals. The first and second tools may be positioned relative to each other such that the second tool is viewable by the imaging device, and may be seen in the images captured by the imaging device. In a second mode, the second mode being a type of clutch mode, the control system 140 may provide a reminder to the operator to reposition one or more hand input devices based on one or more parameters. For example, the control system 140 may provide a reminder based on the one or more parameters satisfying at least one condition for the reminder provision.

The parameters satisfying at least one condition for the reminder provision may be derived from, or otherwise based on, the head and hand signals received by the control system 140 while the system 100 is in the clutch mode. The head and hand signals indicate the position and/or orientation of the display unit and of the one or more hand input devices. As used herein, the term "parameters" may refer to a scalar, vector, matrix, or other quantifiable, measurable, or derivable information. The parameters may be evaluated against one or more conditions to determine whether or not to provide a reminder. The parameters may be evaluated against the condition(s) through various comparisons, algorithms, functions, and the like. Examples of parameters include the magnitude, frequency, and other characteristics of the head input and hand input signals. Other examples of parameters include the positions, orientations, linear or angular velocities (direction and/or magnitude), linear or angular accelerations (direction and/or magnitude), or other positional characteristic of the pose or motion of the display unit and/or the one or more hand input devices. Further examples of parameters include a difference between positions along one or more dimensions, a linear or angular distance between different physical components or, an amount of linear or rotational movement of a same component, a difference between initial and final linear or angular positions that indicate a net translation or rotation. Some examples of the one or more parameters, and related example conditions used to determine if and when to provide a reminder are next described with reference to FIGS. 7A through 7E.

Additionally, in some instances, the control system 140 checks for reminder refraining or cessation conditions, and does not provide (refrains from providing) or stops providing (ceases the provision of) reminders based on one or more reminder refraining or cessation conditions being met. For example, some reminder refraining or cessation conditions may improve the user experience by reducing the instances where the reminder would be extraneous or distracting, such as when the operator is engrossed with another task or intentionally did not move the head input device and/or the hand input devices. The reminder refraining or cessation conditions may be checked before, at the same time as, and/or after checking for the reminder provision conditions.

In some instances, the provision and the refraining of reminders is binary, such that the system either provides the reminder or does not provide the reminder. In some instances, the provision and refraining of reminders is not binary, and partial provisions of, or partially refraining from or ceasing provision of, reminders is possible. Thus, for example, a system may provide a reminder in response to the one or more parameters satisfying any condition of a plurality of conditions for the reminder provision. In some instances, satisfying different conditions of the plurality of conditions results in a same reminder. In some instances, satisfying different conditions of the plurality of conditions results in reminders that differ in type, duration, intensity, visibility if visual reminder), etc. For example, satisfying a first condition of the plurality of conditions results in a visual reminder while satisfying a second condition of the plurality of conditions results in an aural reminder (or both a visual and an aural reminder). As another example, satisfying a first condition of the plurality of conditions results in a reminder that is less visible (e.g., more transparent, less bright, smaller, displayed for a shorter amount of time, etc.) than satisfying a second condition of the plurality of conditions. As another example, in some instances, satisfying more conditions of the plurality of conditions results a reminder that is more visible (e.g., more opaque, brighter, larger, displayed for a longer amount of time, animated, etc.) than satisfying fewer conditions of the plurality of conditions.

Similarly, a system may refrain from providing a reminder in response to the one or more parameters satisfying any condition of a plurality of conditions for reminder provision. In some instances, satisfying different conditions for reminder refraining results in the same type or amount of refraining from providing reminder. In some instances, satisfying different conditions, or different number of conditions, result in reminder refraining that differ in type, duration, intensity, visibility (if visual reminder), etc. For example, satisfying a first condition of the plurality of conditions for reminder refraining results in refraining of a visual reminder while satisfying a second condition of the plurality of conditions results in refraining of an aural reminder (or both a visual reminder and an aural reminder). As another example, satisfying a first condition of the plurality of condition for reminder refraining results in a reminder that is less visible (e.g., more transparent, less bright, smaller, displayed for a shorter amount of time, etc.) than satisfying a second condition of the plurality of conditions. As another example, in some instances, satisfying more conditions of the plurality of conditions for reminder refraining results in more complete reminder refraining (e.g., less visible, longer duration, etc.) than results from satisfying fewer conditions of the plurality of conditions. Some examples of conditions for refraining or ceasing reminders are described with reference to FIGS. 7F and 7G.

FIGS. 7A-7G describe examples of conditions and associated parameters for providing reminders, and also examples of conditions and associated parameters for refraining from providing and ceasing provision of reminders. These examples are illustrative, and other conditions or parameters may be used by a system. Also, the conditions may be used separately or in combination; that is, a system may be configured with one of the following conditions or another condition, or may be configured with any combination of two, three, or more of the following or other conditions. Some examples discussed derive parameters from the movement of hand input workspaces, such as relative to the head or head input device. In various instances, movement of the hand workspace relative to the head is determined as a function of translation and rotation of the head. In some instances, the hand input pose is transformed relative to the head reference frame and compared to a hand input workspace that has been defined or mapped relative to the head pose. If these parameters satisfy certain conditions, reminders are either not provided or ceased from being provided.

Figure 7A:
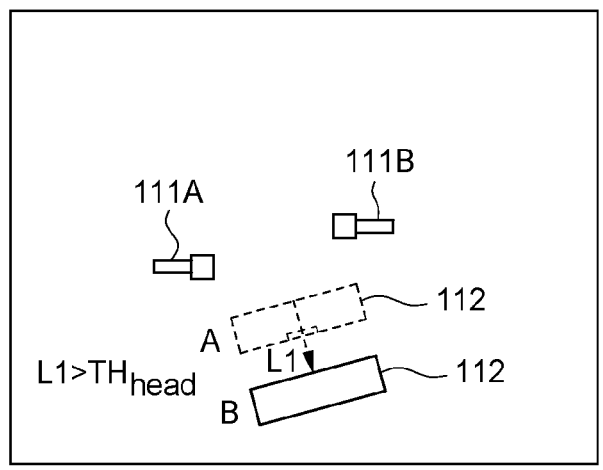
FIG. 7A illustrates a first example set of parameters.

FIG. 7A illustrates a first example set of one or more parameters. With reference thereto, two positions of the display unit 112 are shown within a workspace. Both are positions of the display unit 112 are shown after the control system 140 has entered the clutch mode. Initially, right after entry into the clutch mode, the display unit 112 was at position A (where display unit 112 is shown in dashed lines). At this point, there has been no change in position of any device, and no reminder is provided. Subsequently, the operator moves the display unit 112 to a second position, position B, which is a change of length L1. However, the hand input devices 111A and 111B were not moved. In this example, the control system 140 evaluates the distance between the display unit's first and second positions A, B, shown as L1. In this example, the control system 140 causes the display unit 112 to provide a hand reminder if L1 is greater than a defined threshold $TH_{head}$. In one or more instances, the hand reminder is provided regardless of if any of the hand input devices 111A and 111B has moved while the system was in clutch mode. In other instances, the parameter evaluated may be a total distance travelled by the display unit 112 between positions A, B, which would differ from L1 if the display unit did not take the shortest path between positions A, B.

Figure 7B:
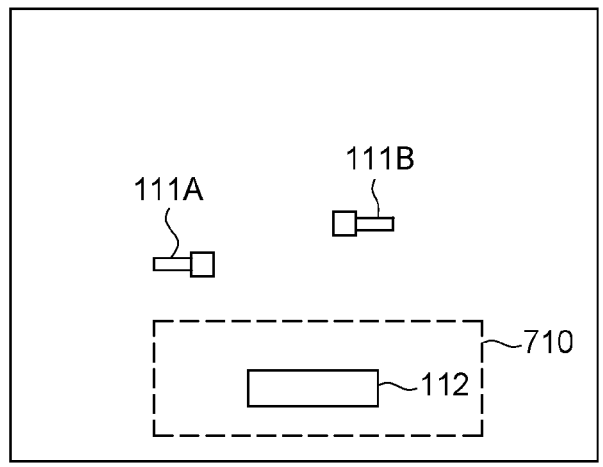
FIG. 7B illustrates a second example set of parameters.

FIG. 7B illustrates a second example set of one or more parameters. With reference to FIG. 7B, positions of the three input devices 111A, 111B, 112 are shown at an instant after some time has passed since the system entered clutch mode. The display unit 112 has moved from its position at entry into the clutch mode. In the example of FIG. 7B, after entry into the clutch mode, the positions of the input devices may be obtained, and a hand reminder provided whenever the hand input devices 111A and 111B are not within a bounding region 710 that surrounds the then current position of the display unit 112. Thus, the one or more parameters include the positions of the hand input devices 111A, 111B, and of the display unit 112. Based on the position of the display unit 112, a bounding region 710 is defined. The bounding region 710 may be of any appropriate number of dimensions, including two-dimensions and three-dimensions. In some instances, if the positions of at least one of the hand input devices 111A, 111B is outside the bounding region 710, a hand reminder is provided. In some instances, the bounding region 710 may be understood as a measure of proximity of the hand input devices to the display unit 112. In some instances, the control system 140 provides a hand reminder in response to a distance between the display unit 112 and the hand input device(s) 111A, 111B exceeding a threshold distance. In some instances, the control system 140 provides a hand reminder in response to the distance between the display unit 112 and the hand input device 111A, and the distance between the display unit 112 and the hand input device 111B, both exceeding a threshold distance.

In some instances, the hand reminder indicates which hand input device 111A, 111B is outside of the bounding region 710, or is at a distance from the display unit 112 that is past a threshold distance. In some instances, a hand reminder is provided if the positions of all of the hand input devices 111A, 111B are outside the bounding region 710 (or beyond the threshold distance from the display unit 112), and no hand reminder is provided if at least one of the hand input devices 111A, 111B is inside the bounding region 710 (or within the threshold distance from the display unit 112).

This example situation shown in FIG. 7B may occur, for example, when the operator, while the system is in the clutch mode, moves the display unit 112, but does not move the hand input devices 111A, 111B to keep them within a proximity to the display unit 112 For example, the parameters of the positions of the hand input devices 111A, 111B and display unit 112 may be checked against the condition in a continuous software loop that runs while the system is in clutch mode and determines if a hand input device is within the bounding region 710, is within a threshold distance of the display unit 112, or is otherwise sufficiently proximate to the display unit 112. In some instances the bounding region may be shaped to allow the hand input devices 111A, 111B to be farther away horizontally than vertically from the display unit 112 without triggering a hand reminder. In this example, the bounding region 710 is shown as a box-shape; however, in various instances, the bounding region 710 may have any appropriate shape and size, and may be a convex polyhedron, a concave polyhedron, an ellipsoid, a union of polygons or ellipsoids or other complex shape, a swept volume, etc. For example, in other instances, the hand input workspace shape and size, and the positioning of the bounding region 710, may be determined to preserve an working relationship relative to the head pose as detected by the head input sensor 190 of the display unit 112. This working relationship may be determined based on any appropriate factor, including ergonomics.

Figure 7C:
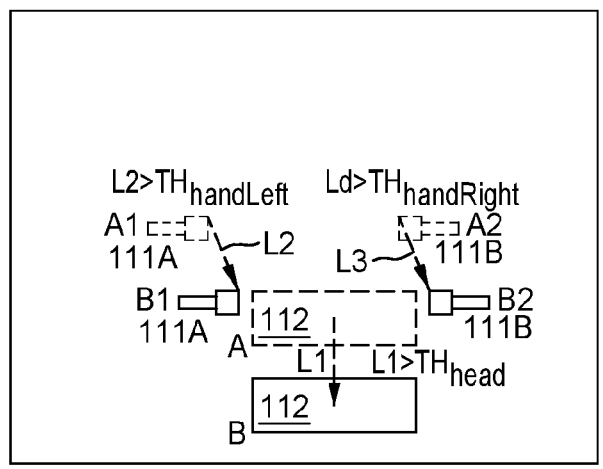
FIG. 7C illustrates a third example set of parameters.

FIG. 7C illustrates a third example set of one or more parameters. FIG. 7C shows two positions of each of the display unit 112 (position A and B), the left hand input device 111A (positions A1 and B1), and the right hand input device 111B (positions A2 and B2) after entry into the clutch mode. In the FIG. 7C example, at a first time T1C just after the system has entered the clutch mode, the display unit 112 was at a first position (position A, shown in dashed lines), the left hand input device 111A was at a first position (position A1, also shown as dashed lines), and the right hand input device 111B was at a first position (position A2, also shown as dashed lines). FIG. 7C shows a top view projection onto 2D space. Some instances may use as a parameters comprising orientations in such 2D projection, in another 2D projection (e.g. to a plane orthogonal to the plane shown in FIG. 7D), in 3D space, etc. Each of the input devices 112, 111A, 111B may be a rigid body, or may have multiple subcomponents that can move or flex relative to each other. Where the input devices 112, 111A, 111B are not rigid bodies, the "positions" of the input devices may be more complicated than a single value; however, for simplicity of explanation, a representative position is shown. Examples of representative positions include: a position of a geometric center, of a centroid, of a location of interest such as a location at which the operator contacts the input device, of an aggregation of different positions of different subcomponents, etc. Some instances may use such representative position or more complex position representations (e.g., in vectors, matrices, etc.) as the parameters evaluated against condition(s) for reminder provision.

At time T1, no hand reminder is provided. Subsequently, at a second time T2D later than T1C, the operator has moved the display unit 112 by an amount of motion L1 to a second position (position B) the left hand input device 111A by an amount of motion L2 to a second position (position B1), and the right hand input device also by an amount of motion L2 to a second position (position B2). One or more conditions can be applied to these parameters to determine whether a hand reminder is provided by the computer-assisted robotic system 100 to the operator.

For convenience, these Figures depict a 2D top view of a 3D work environment. Thus, in one or more instances, the parameters considered can be a 2D projection of the 3D motion, or the actual 3D amount of motion. Accordingly, the change in position shown as a L1, L2, and L3 may be a 2D vector projected onto a plane (e.g., a horizontal plane) a 3D vector in three-dimensional space.

In one or more instances, a condition may be applied to the hand input device parameters using a first threshold $TH_{handLeft}$, and a second threshold $TH_{handRight}$. These thresholds $TH_{handLeft}$ and $TH_{handRight}$ may be used separately from, or together with, the threshold $TH_{head}$. In one instance, if L1 is greater than $TH_{head}$, and either L2 is less than $TH_{handLeft}$, or L3 is less than $TH_{handRight}$, a hand reminder is provided by the computer-assisted robotic system 100 to the operator. The reminder may be for both hand input devices, as shown in FIG. 6B, or it may be for only one hand input device, such as the one that has moved less than its associated threshold. In another instance, if L1 is greater than $TH_{head}$, and both L2 is less than $TH_{handLeft}$ and L3 is less than $TH_{handRight}$, a hand reminder is provided to the operator. In this example, the hand reminder may be for both hand input devices. For example, the hand reminder may include a visual portion as shown in FIG. 6B. In still another instance, the hand reminder may be provided if at least one of the following is true: L2 is less than $TH_{handLeft}$, or L3 is less than $TH_{handRight}$, regardless of the movement, or lack of movement of the display unit 112. In some instances, $TH_{handLeft}$ and $TH_{handRight}$ may have the same value, and may therefore reduce to a single hand threshold, $TH_{hand}$, for each of the above described instances. In some instances, $TH_{handLeft}$ and $TH_{handRight}$ may be defined based on $TH_{head}$, such as being proportional to or some other function of $TH_{head}$. In some instances, $TH_{handLeft}$ and $TH_{handRight}$ may be defined based on L1, and thus express a reminder for a repositioning of the hand input devices relative to a repositioning of the display unit. In some instances, the values of $TH_{handLeft}$, $TH_{handRight}$, and $TH_{head}$ are variable, and in some other instances, the values of $TH_{handLeft}$, $TH_{handRight}$, and $TH_{head}$ are fixed.

Figure 7D:
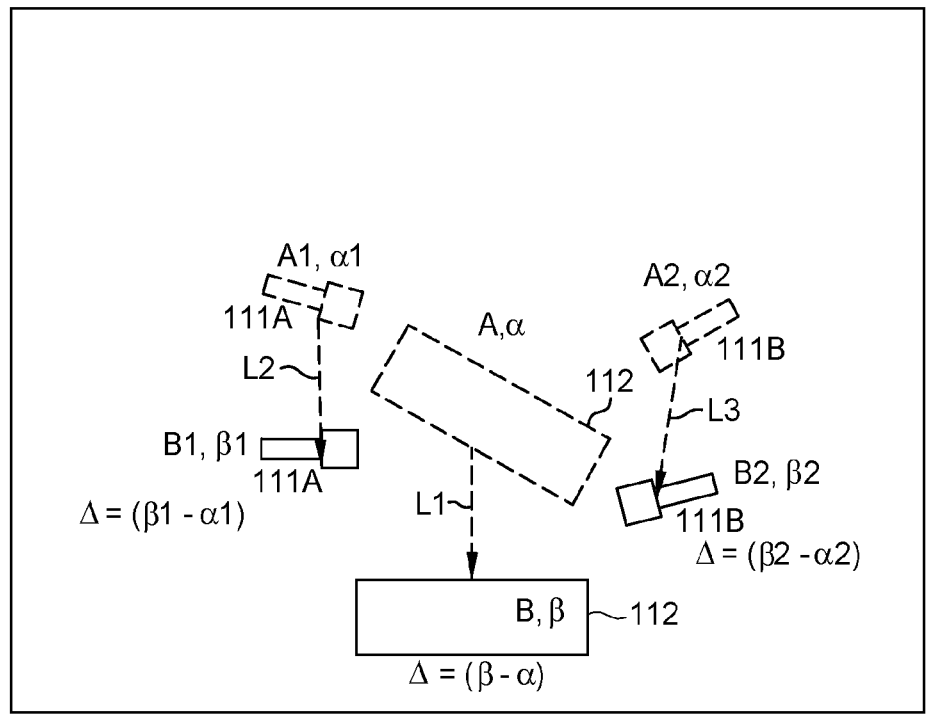
FIG. 7D illustrates a fourth example set of parameters.

FIG. 7D illustrates a fourth example set of one or more parameters. The example parameters illustrated in FIG. 7D include both positions and orientations of input devices. In the example of FIG. 7D, the changes to both position and orientation for each input device are obtained as parameters for determining if to provide a reminder. In some instances, the parameters evaluated for reminder provision include the positions and orientations of the head and all hand input devices. In some instances, the parameters evaluated for reminder provision include the positions of the head and hand input devices, and the orientations of the head input device and fewer than all of the hand input devices (e.g., a subset of the hand input devices or no hand input devices). The parameters may comprise fewer than the orientations of all hand input devices in instances where the system is not configured to evaluate the disregarded orientations in determining if to provide a reminder. The parameters may comprise fewer than the orientations of all hand input devices in instances where the system controls, or attempts to control, the disregarded orientations. For example, in some instances, a computer-assisted robotic system commands an actuator or a brake of the hand input device to hold the orientation of the hand input device during the clutch mode. In another example, parameters associated with a hand input devices may be disregarded if the hand input device is not associated with control of a tool or other virtual or actual item visible in the workspace. In some of these instances the example parameters of FIG. 7D may not comprise the orientation(s) of the hand input device(s) that are disregarded.

FIG. 7D, illustrates the display unit 112, the left hand input device 111A, and the right hand input device 111B each at a first position in a first orientation αt a time T1D (shown in dotted lines) and a second position in a second orientation αt a later time T2D (shown in solid lines). Each of the input devices 112, 111A, 111B may be a rigid body, or may have multiple subcomponents that can move or flex relative to each other. Where the input devices are not rigid bodies, the "positions" of the input devices 112, 111A, 111B may be more complicated than a single value, similar to discussed above in conjunction with FIG. 7C. Further, where the input devices are not rigid bodies, the "orientations" of the input devices 112, 111A, 111B may be more complicated than a single value; however, for simplicity of explanation, a representative orientation is shown. Examples of representative orientations include: an orientation of a subcomponent, a line segment or plane defined by features of the input device, etc. Some instances may use such representative position or more complex position representations (e.g., in vectors, matrices, etc.) as the parameters evaluated against condition(s) for reminder provision. In FIG. 7D, the representative orientations are expressed as angle values labeled by a corresponding Greek letter. In one or more instances with an input control system like the one shown in FIG. 3, the orientation refers to a leftward-rightward turning of each of input devices 112, 111A and 111B along the yaw DOF 318. In some instances, the orientation may be determined relative to a world frame of reference, a home orientation for the input device, a previous orientation such as the orientation αt entry into the clutch mode, etc. FIG. 7D shows the orientations in a top view, in a 2D projection. Some instances may use parameter comprising orientations in such 2D projection, in another 2D projection (e.g. to a plane orthogonal to the plane shown in FIG. 7D), in 3D space, etc.

As shown in FIG. 7D, at T1D, at or just after entry into the clutch mode, the display unit 112 was at position A with orientation α, the left hand input device 111A was at position A1 with orientation α1, and the right hand input device 111B was at position A2, with orientation α2. Subsequently, at a later time T2D, the operator has moved the display unit 112 to a second position B and orientation β, which is associated with a change in position of distance L1, and a change in orientation of β-α. From T1D to T2D, the operator has also moved left hand input device 111A to second position B1 and orientation β1, which is associated with a change in position of distance L2 and a change in orientation of β1-α1. Also, from T1D to T2D, the operator has moved right hand input device 111B to second position B2 and orientation β2, which is associated with a change in position of distance L3 and a change in orientation of β2-α2. In the example of FIG. 7D, the position and orientation αt time T2D of the display unit 112 (B and β) are close to that of the home position and orientation. The position and orientation αt time T2D of the left hand input device 111A (B1 and β1) are closer to, but not at its home position and orientation. The position and orientation αt time T2D of the right hand input device (B2 and β2) are closer to, but not at its home position and home orientation.

Depending on the parameters used and the conditions that are applied to the parameters, the system may or may not provide a reminder. The parameters and associated conditions evaluating an amount of movement (e.g., as expressed a L1, L2 and L3 in the example of FIG. 7C) discussed in conjunction with FIG. 7C can also be applied the example shown in FIG. 7D. FIG. 7D also illustrates further examples, were other parameters and conditions are considered in addition to, or instead of, the parameters and conditions described in association with FIG. 7C. For example, some instances are configured with conditions based on changes in orientation of one or more input devices, or on a combination of changes in both position and orientation of one or more input device (e.g., three input devices, such as a head input device, a first hand input device, and a second hand input device). In other instances, the thresholds on relationships between head movement and hand movement may be determined from anthropometric data on different body sizes and then selected via user profile settings for body sizes or specific body dimensions (e.g., arm length, trunk measurements, and the like).

In a first example, the system 100 is configured with a condition based on a change in orientation of the display unit, and determine that a reminder is to be provided by the system 100 to the operator based on a parameter related to the change in orientation. In a second example, the system is configured with a condition based on an amount of rotation of a hand input device from a previous orientation, and an amount of rotation of the display unit from a previous orientation of the display unit; thus, the system may determine that a reminder is to be provided based on these rotational parameters satisfying the condition. Examples that consider the amount of rotation of the hand input device can be used by any system, and may be more natural for systems that do not command the hand input devices to a certain pose, and may be more applicable for systems that do not lock hand input device orientation when the system is in the clutch mode.

As a specific example with reference to FIG. 7D, in some instances, the conditions for hand reminder provision comprise β-α being above a defined head rotational threshold $TH_{headrotate}$ (the head input device 112 has rotated by more than $TH_{headrotate}$), and at least one of β1-α1 or β2-α2 being below a defined hand rotational threshold $TH_{handrotate}$ (at least one hand input device 111A, 111B has rotated by less than $TH_{headrotate}$). In some instances, $TH_{headrotate}$ and $TH_{handrotate}$ are set such that the conditions for reminder provision require that the operator has changed the orientation of the display unit 112, and has not changed, or has only minimally changed, the orientation of one or more hand input devices 111A or 111B. In some instances, the hand reminder may be visual, and may specifically indicate that one or both hand input devices has changed in orientation by less than $TH_{handrotate}$. $TH_{headrotate}$ and $TH_{handrotate}$ may be set to any appropriate value. In some instances, $TH_{handrotate}$ is set such that rotational amounts greater than $TH_{handrotate}$ is generally intentional. In some instances, $TH_{handrotate}$ is set to 30 degrees, 45 degrees, or an amount between 30 and 45 degrees. Further, although this example applies the same threshold $TH_{handrotate}$ to multiple hand input devices 111A, 111B, other instances may apply different thresholds (to $TH_{handrotate\_A}$, $TH_{handrotate\_B}$) to different hand input devices 111A, 111B.

As another specific example with reference to FIG. 7D, the one or more parameters include changes in the position and the orientation of one or more input devices, and the hand reminder is provided when the condition for reminder provision requires that both position-based and orientation-based requirements be met. For example, the condition may include: a change in position of a hand input device 111A, 111B being lower than a threshold $TH_{hand}$, a change in orientation of that hand input device 111A, 111B being lower than a threshold $TH_{handrotate}$, a change in position of the display unit 112 being higher than a $TH_{head}$, and a change in orientation of the display unit 112 being higher than a $TH_{headrotate}$. In some instances, the hand reminder may be visual, and may specifically indicate which conditions were met to produce the reminder (e.g., which hand input device has not moved by more than the associated change in position threshold or more than a change in orientation threshold, if the head input device has not satisfied the head position or orientation change thresholds, etc.) For example, a visual reminder similar to what is shown in FIG. 6B with the a curved arrow added near or around each visual hand reminder 610, 611, with the arrow indicating with the labeled reminder that rotation of the associated hand input device(s) would cause the condition for reminder provision to become no longer met.

In further specific examples with reference to FIG. 7D, the parameters may include other translations or rotations of the display unit 112 and/or one or more of the hand input devices 111A, 111B, after entry into the clutch mode. The translations and rotations evaluated may be that along particular axes or in particular planes, may be a net translation and/or rotation during a specific time period, may be a total translation and/or rotation during a specific time period, etc. For example, a net translation and/or rotation during a specific time period may comprise a difference between a position/orientation α at clutch entry and a position/orientation α at the end at the occurrence of some event. For example, a total translation and/or rotation during a specific time period may comprise a summation of the magnitudes of translational and/or rotation from clutch entry to the occurrence of some event, even if the direction of motion is the opposite of a previous motion. Examples of events include the stopping of movement of a head input device comprising the display unit 112, a passage of a predefined duration of time after clutch entry, etc. The translations and rotations may be compared with any appropriate condition to determine whether to provide a reminder. Example conditions may comprise comparison to defined thresholds, as described above, comparison to each other (e.g., translation of the head input device compared to the translation of a hand input device, or to the translations of multiple hand input devices; translations of hand input devices compared to each other, etc.), comparison to themselves (e.g., evaluating their changes over them), etc. Comparisons may also be based on a reference pose of an operator's head and hands when the operator is first starting to use the system, or when the operator is configuring a user profile. The reference pose may be refined by the system based on operator use over time. As a specific example, a condition may compare the translation and/or rotation of an input device that has met or exceeded a relevant threshold with another input device that has not met the corresponding thresholds. All such combination conditions are understood to be within the scope of this disclosure.

Figure 7E:
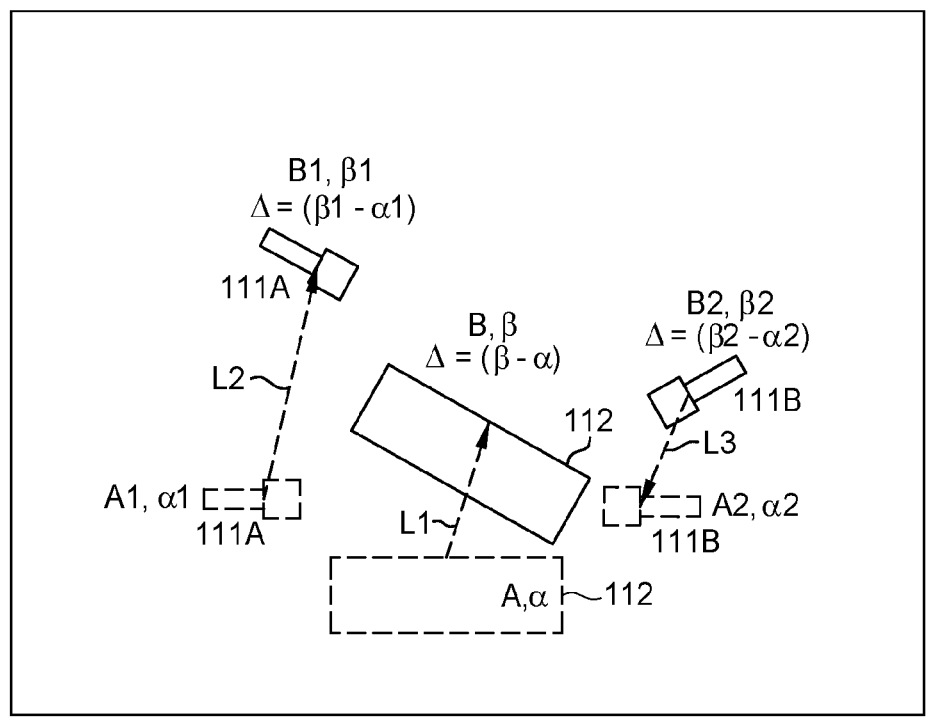
FIG. 7E illustrates a fifth example set of parameters.

FIG. 7E illustrates a fifth example utilizing previously obtained or previously defined home positions for each of the input devices. For example, these home positions may be operator defined, acquired at the previous entry into the HCM defined based on the body types and sizes of operators, determined based on an average of aggregate input device positions over time, etc.

In FIG. 7E, the home positions for the input devices 111A, 111B, 112 are indicated using dashed lines for each device's boundary. The home position of the display unit 112 is at position A with orientation α, the home position of the hand input device 111A is at position A1 with orientation α1, and the home position of the hand input device 111B is at position A2, with orientation α2. At a time T2E after entry into the clutch mode, the position and orientation of display unit 112 is at position B and orientation β, which is at a displacement of L1 and a net rotation of β-α relative to its home position and orientation. Meanwhile, the hand input at time T2E is at position B1 with orientation β1, which is at a displacement L2 and a net rotation of β1-α1 relative to its home position and orientation. Also at T2E, the and input device 111B is at position B2 with orientation β2, which is at a displacement of L3 and a net rotation net of β2-α2 relative to its home position and orientation. As may be seen in FIG. 7E, while the display unit 112 is relatively close to its home position at A and its home orientation of α, the positions of the hand input devices 111A and 111B are relatively far from their respective home positions and r home orientations.

In the example of FIG. 7E, various conditions for hand reminder provision may be applied to determine if a reminder is to be provided. It is noted that the example of FIG. 7E is similar to that of FIG. 7D, except that the baseline for comparison comprises home positions for the input devices 111A, 111B, 112. Therefore, equivalent parameters and conditions may be used in the example of FIG. 7E as were described above with reference to FIG. 7D. For example, in some instances, the conditions for hand reminder provision comprise β-α being above a defined head rotational threshold $TH_{headrotate}$ (the head input device 112 has rotated by more than $TH_{headrotate}$), and at least one of β1-α1 or β2-α2 being below a defined hand rotational threshold $TH_{handrotate}$ (at least one hand input device 111A, 111B has rotated by less than $TH_{headrotate}$). As another specific example, the condition may include: a change in position of a hand input device 111A, 111B being lower than a threshold $TH_{hand}$, a change in orientation of that hand input device 111A, 111B being lower than a threshold $TH_{handrotate}$, a change in position of the display unit 112 being higher than a $TH_{head}$, and a change in orientation of the display unit 112 being higher than a $TH_{headrotate}$. Analogs to further examples described in conjunction with FIG. 7D also apply here, and thus are not repeated here.

In one or more instances, the hand reminder provided (e.g. the hand reminders provided in connection with any of the examples of FIGS. 7A through 7E) may include a visual indicator indicative of a current position of a hand input device compared to a previous position of the hand input device. Or, for example, the hand reminder may include a visual indicator indicative of a current position of the input device 111A, 111B compared to a previous position of the input device 111A, 111B, or a visual indicator indicative of a suggested direction to move a hand input device. In one or more instances, a control system 140 of the computer-assisted robotic system 100 may be configured to provide the hand reminder to the operator in a fixed location relative to the displayed image, in a variable location relative to the location of the input devices 111A, 111B, 112 relative to each other or their relative workspaces, in a variable location relative to the location of the depiction of the tool controlled by the input device during a previous teleoperation period, etc. In some instances, the control system 140 may be configured to determine a direction of attention of the operator, and render the hand reminder in a location based on the detected direction of attention.

Figure 7F:
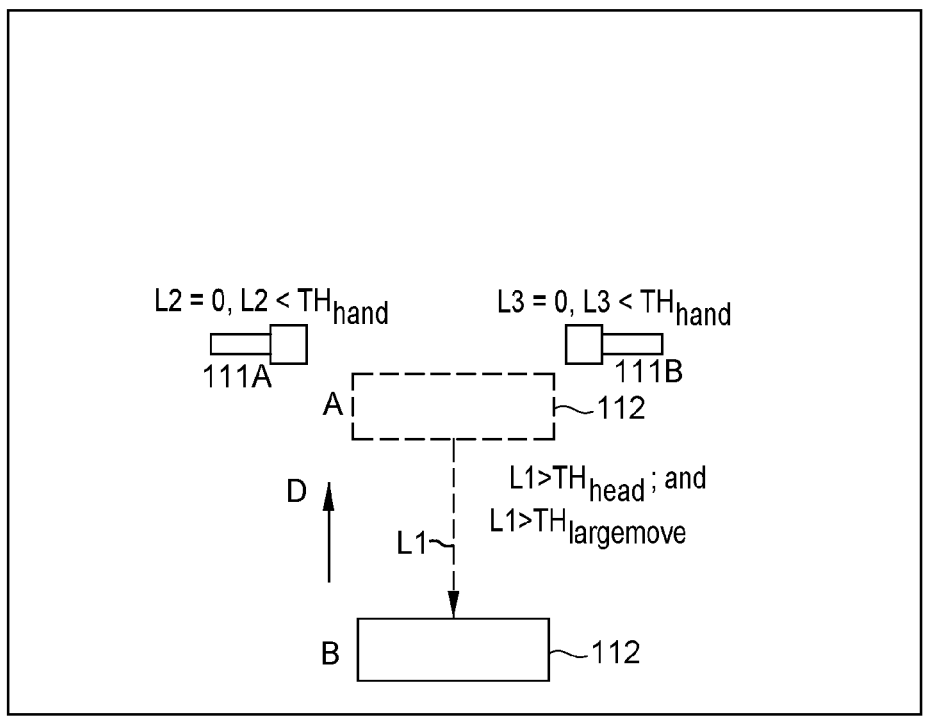
FIG. 7F illustrates a first example of when a hand reminder is not provided to an operator.

FIG. 7F, next described, illustrates an example of when a hand reminder may not be provided by the computer-assisted robotic system 100 to an operator, even though the conditions are met for providing the reminder to the operator. In one or more instances, the control system 140 may refrain from or cease provision of the hand reminder under certain conditions.

With reference to FIG. 7F, two positions of the display unit 112 are shown within the workspace. Both are positions of the display unit 112 that were obtained after the system 100 has entered clutch mode. At time of entry into the clutch mode T1F, the display unit 112 was at a first position A (where display unit 112 is shown in dashed lines). Subsequently, at a later time T2F and with the system 100 still in the clutch mode, the operator has moved the display unit 112 to a second position B, which involves a net translation of distance L1. Meanwhile, the hand input devices 111A and 111B were not moved from time T1F and T2F. It is noted that the example of FIG. 7F is similar to that shown in FIG. 7A. Accordingly, in an instance where a condition for reminder provision requires only that L1 be greater than a defined threshold $TH_{head}$, the system 100 would provide a hand reminder to the operator. However, in the example of FIG. 7F, the control system 140 is further configured to consider reminder refraining conditions.

The control system 140 may be configured with any appropriate reminder refraining conditions. An example reminder refraining condition requires that L1 be less than a "large move" threshold $TH_{largemove}$, where $TH_{largemove} > TH_{head}$. $TH_{largemove}$ may be any appropriate value larger than $TH_{head}$. For example, $TH_{largemove}$ may be a multiple of $TH_{head}$, such as $K*TH_{head}$, where K is equal to 1.5, 2, 3, or any other factor. In the example of FIG. 7F, L is greater than $TH_{largemove}$, so system 100 provides no hand reminder even though L is greater than $TH_{head}$. In some instances, the reminder refraining condition comprises that the net displacement, the total distance travelled, or some other characteristic measure of display unit 112 translation relative to a baseline position being greater than $TH_{largemove}$, and hand reminders are not provided when such reminder refraining condition is met regardless of which hand reminder provision conditions are applied. The large move threshold $TH_{largemove}$ condition may be helpful to help reduce unnecessary reminders where the operator is intentionally moving the display unit 112 into a position appropriate for a large translational head input, such as to command the imaging device to move a large distance after the system again enters the teleoperation mode. In some instances, example conditions of FIGS. 7A and 7F may are combined as "If and only if $TH_{head} < L1 < TH_{largemove}$ is TRUE," such that the system 100 will provide a hand reminder only when the combined condition is met.

As another example, in some instances a large head move would not trigger a reminder when the direction of head motion is strongly correlated with preparation for another action. For example, in some architectures, a large head movement away from the home pose is different from large movement towards the home pose. When the head makes a large movement towards the home pose, it is more likely that the operator will also move his/her hands along with the head, and a reminder is provided if the hands do not move. However, in some instances a large head movement is away from the home pose is likely to be preparation for a follow-on command involving a large head or hand movement (e.g. such as to command a large movement of an imaging device), and the system will cease or refrain from providing a reminder. In some instances, a time-out is also applied, such that if the follow-on command does not occur in a predefined period of time, the system will stop ceasing or refraining from providing the reminder, and provide the reminder.

When the large move threshold $TH_{largemove}$ is exceeded, it may be assumed that the operator has not forgotten to move the hand input devices, but has rather caused the system to enter clutch mode in order to prepare for a large move of the imaging device, effected via a large move of the display unit 112, once the system again enters a teleoperation mode. The operator thus wants the hand input devices to remain where they are, and plans, for example, to move the display unit back to approximately position A within the workspace, which will cause the imaging device to move a large amount in the direction D shown in FIG. 7F.

Figure 7G:
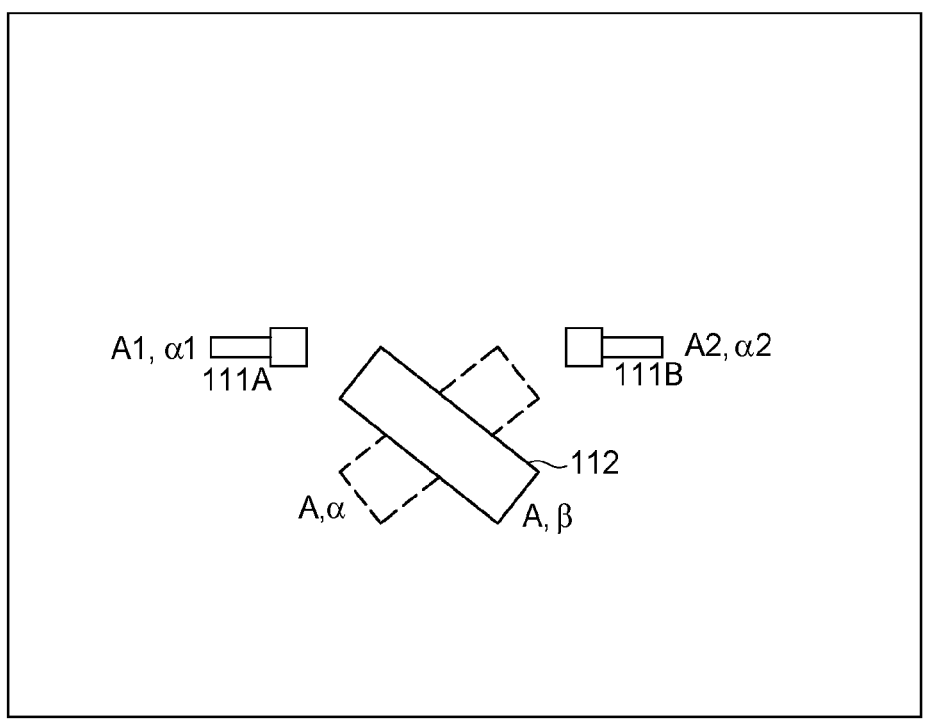
FIG. 7G illustrates a second example of when a hand reminder is not provided to an operator.

FIG. 7G, next described, illustrates another example of reminder refraining conditions where a hand reminder may not be provided by the even though one or more reminder provision conditions are met. The example of FIG. 7G is a rotational analog to the positional example of FIG. 7F. With reference to FIG. 7G, two orientations of the display unit 112 are shown within the workspace, at the same position. Initially, right after system 100's entry into the clutch mode at time T1G, the display unit 112 had orientation α. Subsequently, at time T2G and while the system 100 is still in the clutch mode, the operator has rotated the display unit 112 to a second orientation β. In the example situation of FIG. 7G, for a system configured to provide a hand reminder in response to the rotation β-α being larger than a first threshold $TH_{headrotate}$, the system 100 would generally provide a hand reminder at or shortly after time T2G. FIG. 7G illustrates an example where the control system is further configured with a reminder refraining condition of the rotation β-α exceeding a "large head rotate" threshold $TH_{largeheadrotate}$, where $TH_{largeheadrotate} > TH_{headrotate}$. $TH_{largeheadrotate}$ may be any appropriate value larger than $TH_{headrotate}$. For example, in some instances, $TH_{largeheadrotate}$ is 45, 60, 90, or other number of degrees. As another example, $TH_{largeheadrotate}$ may be a multiple of $TH_{headrotate}$, such as $R*TH_{headrotate}$, where R is equal to 1.5, 2, 3, or any other factor). In the example of FIG. 7F, β-α is greater than $TH_{largeheadrotate}$, so system 100 provides even though β-α is greater than $TH_{headrotate}$. In some instances, the reminder refraining condition comprises that the net rotation, the total amount of rotation occurring between T1G and T2G, or some other characteristic measure of display unit 112 rotation relative to a baseline position being greater than $TH_{largeheadrotate}$, and hand reminders are not provided when such reminder refraining condition is met regardless of which hand reminder provision conditions are applied. The large move threshold $TH_{largeheadrotate}$ condition may be helpful to help reduce unnecessary reminders where the operator is intentionally moving the display unit 112 into a position appropriate for a large translational head input, such as to command the imaging device to rotate a large amount after the system again enters the teleoperation mode.

Similarly, in some instances, a reminder refraining threshold may evaluate hand input device rotation amount against a large rotation threshold "$TH_{largehandrotate}$". In some instances, if this large rotation threshold is exceeded for one or both hand input device, the control system 140 refrains from providing, or ceases providing, a hand reminder. In some instances, $TH_{largehandrotate}$ may be 45, 60, 75, or other amounts of rotation.

Further, in one or more instances, there may be a variety of additional reminder refraining conditions that may be implemented with a control system 140. For example, another example reminder refraining condition comprises that a hand input device having moved by an amount greater than a threshold $TH_{largehandmove}$. A further example reminder refraining condition comprises the display unit having achieved a position and/or orientation that is within threshold deviations relative to a previous position and/or orientation. Yet another reminder refraining condition comprises that the display unit has moved with a speed exceeding a speed threshold.

Hysteretic thresholds can also be used as a condition to refrain reminders. Advantageously, hysteretic thresholds can be used to reduce jitter at a boundary of a movement threshold. For example, after the head input device senses that an operator's head has moved a distance "x", and x is greater than the threshold condition, a reminder is generated if the position of the operator's hands as indicated by the hand input devices haven't moved to a target position. In addition to the reminder is being generated, the threshold is reduced by adding a padding distance such that "x>threshold—padding" condition continues to be true even if the user dithers near the threshold. Once the user crosses the boundary back in the other direction such that "x<threshold—padding", then the padding is removed and the original threshold is restored. Increasing the threshold by the padding distance helps to stabilize system response by reducing the likelihood that small motions will toggle the reminders on and off. Additionally, increasing the threshold would then require a relatively larger head movement in the opposite direction (−x) to clear the triggering condition, and reduce the likelihood that the operator will accidentally cause reminder initiation.

Further example reminder refraining conditions comprise a motion of the display unit being dominated by a pitching motion (a motion associated with the operator pitching his/her head), by the display unit pitching beyond a pitch threshold, by the motion of the display unit being dominated by a change in its vertical height, and by the display unit moving vertically beyond a vertical height change threshold.

As used herein "horizontal movement" is illustrated by the degree of freedom 316 in FIG. 3. In one or more instances, once a reminder has been provided, the reminder may cease to be provided upon the occurrence of one or more reminder cessation conditions. In some instances, where the reminder is a visual reminder or comprises a visual portion, the control system 140 may cease the provision of the reminder by ceasing the visual display of the reminder. Examples of cessation conditions include: all of the reminder provision conditions described herein, a passage of a defined time interval, the parameters that caused the reminder be displayed being determined to no longer fulfilling the conditions for the provision of the reminder, an exit from the clutch mode, an entry into a non-clutch mode, a command to cease by the operator, a movement of the input device associated with the reminder (e.g. a movement of a head input device in response to a head reminder, or a movement of a hand input device in response to a hand reminder), a movement of all input devices for which reminders are actively provided, etc. For example, with reference to FIG. 7C, in some instances, control system 140 may be configured to cause a hand reminder to cease being displayed in response to, at a time subsequent to providing the hand reminder, one, or both of L2 and L3 exceeding their corresponding threshold $TH_{handLeft}$ or $TH_{handRight}$.

The control system 140 may be configured with any appropriate number, types, or combinations of reminder provision conditions, reminder refraining conditions, reminder cessation conditions. For example, in some instances, the control system 140 is configured with both reminder provision conditions and reminder refraining conditions, or with both reminder provision conditions and reminder cessation conditions. As another example, in some instances, the control system 140 is configured with reminder provision conditions, reminder refraining conditions, and reminder cessation conditions. In some instances where control system 140 is configured with both reminder provision conditions and reminder refraining conditions, reminder refraining condition(s) always override reminder provision conditions. In some instances where control system 140 is configured with both reminder provision conditions and reminder refraining conditions, reminder refraining condition(s) and reminder provision condition(s) have relative priorities, and higher priority conditions override lower priority conditions.

Figure 8:
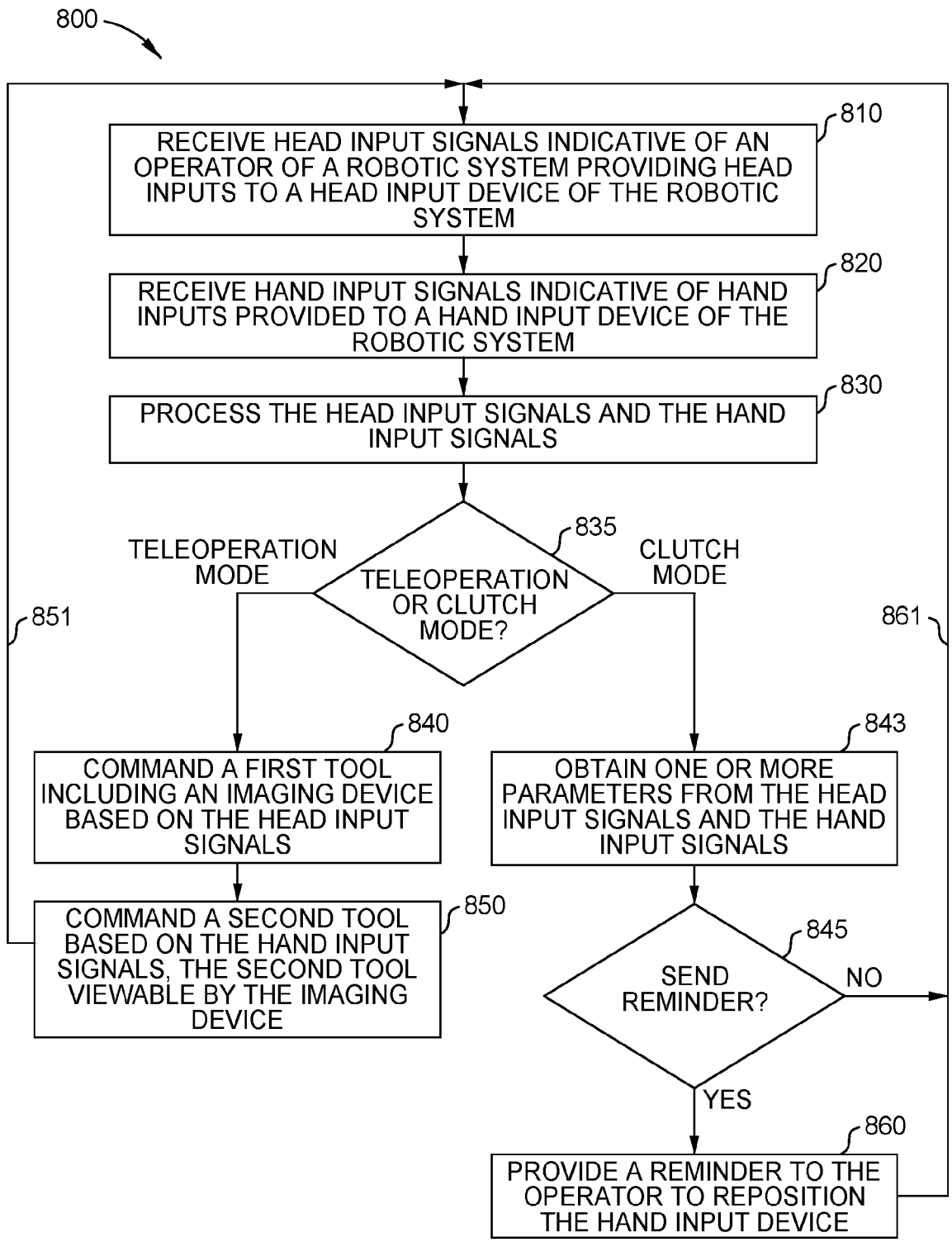
FIG. 8 is a flow diagram of an example method of for providing reminders using a computer-assisted robotic system.

FIG. 8 is a flow diagram of a method 800 for providing reminders with a computer-assisted robotic system. The method 800 is described utilizing blocks 810 through 860. In alternate examples, the method 800 may include more, or fewer, blocks than the blocks 810 through 860. The blocks utilized to perform the method 800 may be performed in a different order than shown in FIG. 8. The method 800 may be performed by a control system of the computer-assisted robotic system, such as, for example the control system 140 of FIG. 1. The method 800 begins at block 810 by receiving head input signals indicative of head inputs provided by an operator of the robotic system to a head input device. For example, with reference to FIG. 2, the head input signals may be generated in response to an operator applying forces to the headrest portion 242, by sensors coupled to, or integrated with the display unit 206.

At block 820, hand input signals indicative of hand inputs provided by the operator of the robotic system to a hand input device are received. For example, with reference to FIG. 1, the hand input signals may be generated by input device sensors coupled to, or integrated with, one or both of the hand input devices 111A, 111B. The hand input signals, when processed by the control system 140, cause the control system 140 to command movement of the tools associated with hand input devices 111A, 111B within the workspace.

At block 830, the head input signals and the hand input signals obtained at blocks 810, 820 are processed. For example, in a teleoperation mode, head input signals are processed by the control system 140 of FIG. 1 to cause the control system 140 to move the display unit 206 within a workspace.

At query block 835 of the method 800, the control system 140 determines whether the computer-assisted robotic system is currently in a teleoperation mode, for example the HCM, or in a clutch mode. Based on a determination at query block 835 that the system is in a "teleoperation mode", the method 800 proceeds to block 840.

At block 840, the display unit changes the image presented. The change to the image may be due to movement an imaging device capturing the displayed image, a digital change to the image (e.g. digital zooming, panning, rotating, etc.), a combination of movement of the imaging device and digitally changing the image, etc. For example, a first tool is commanded by the control system 140 based on the head input signals. In one example, the first tool comprises an imaging device, such as an endoscope, an optical camera, and/or an ultrasound probe, that can capture images of the worksite. From block 840 method 800 moves to block 850, where a second tool is commanded, based on the hand input signals, and where the second tool is viewable by the imaging device. The second tool is viewable by the imaging device where the second tool and/or imaging device may be moved within their respective ranges of motion such that at least a portion of the second tool is in the field of view of the imaging device, or that part or the entirely of the second tool is already the field of view of the imaging device. For example, the tools may be tools 605 and 606 as shown in the example of FIG. 4B, which depicts a view during the HCM. From block 850, method 800 may terminate. Or, for example, method 800 may run as a continuous loop while the computer-assisted robotic system is being used by an operator, and then method 800 returns to block 810 along path 851.

If at query block 835 of the method 800 the control system 140 determines that the system is in a "clutch mode," the method 800 proceeds to block 843. At block 843, the control system 140 obtains one or more parameters from one or both of the head input signals and the hand input signals. For example, changes in position and/or orientation of the display unit 112 and/or one or more of the hand input devices 111A, 111B may be obtained by the control system 140.

From block 843 the method 800 proceeds to query block 845. At query block 845, the control system 140 determines if the one or more parameters satisfy conditions required for a reminder. If control system 140 determines a "No" state (i.e., that a reminder should not be sent) at query block 845, then the method 800 may terminate, as no reminder is to be provided. Alternatively based on the "No" state, the method 800 may return to block 810 along path 861, as shown in FIG. 8, for another iteration of the method 800. If, however, the control system 140 determines a "Yes" state (i.e., that a reminder should be sent) at query block 845, then method 800 proceeds to block 860 where the control system 140 provides a reminder to reposition one or more input devices (e.g. one or more head or hand input devices). For example, the control system 140 may provide a reminder in the form of a visual reminder, such as visual hand reminder 610 or 611, or both, as shown in FIG. 6B. After providing the reminder, the method 800 terminates at block 860, or alternatively may return to block 810 along path 861 illustrated in FIG. 8 for another iteration of the method 800.

Figure 9:
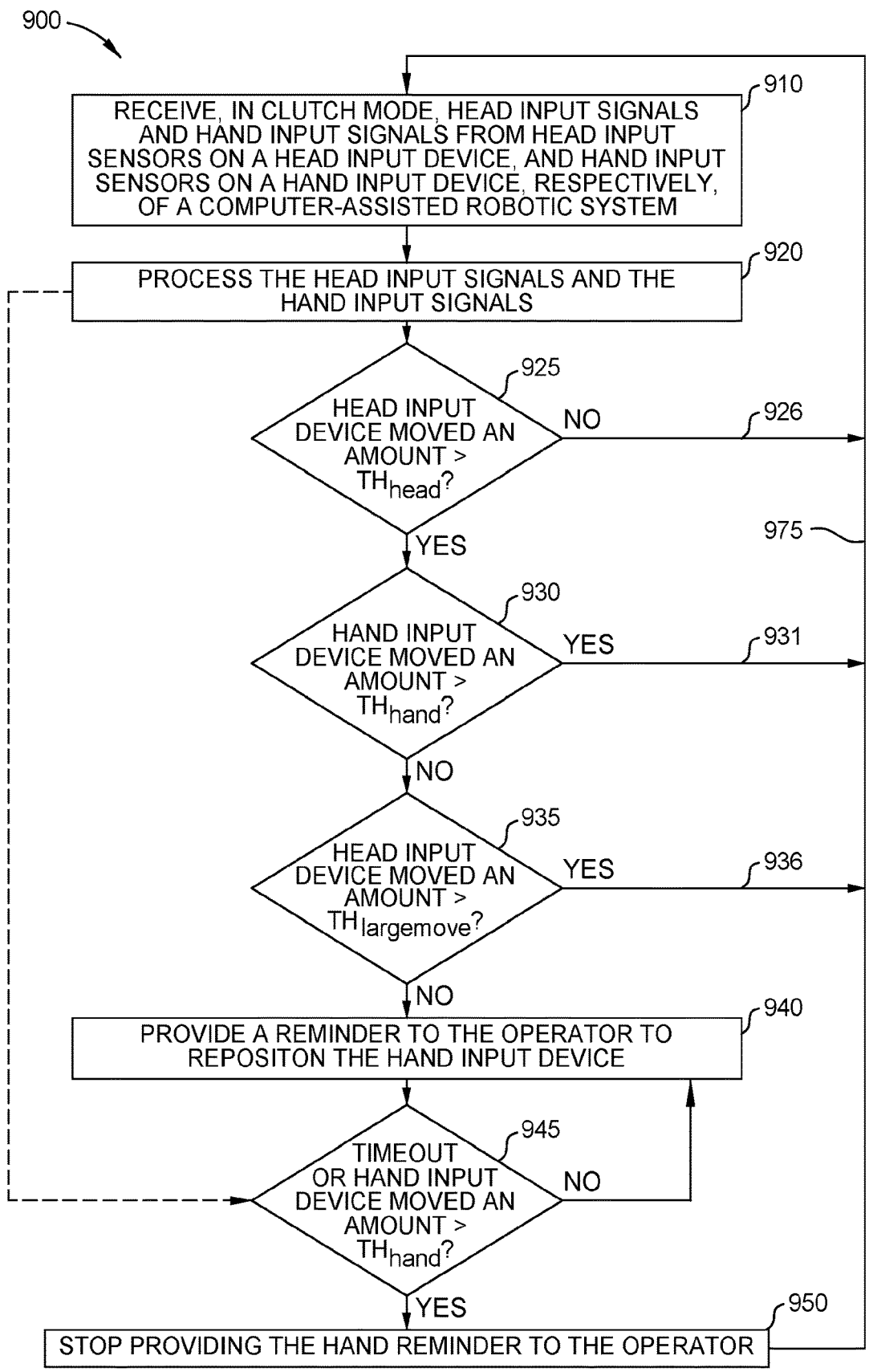
FIG. 9 is a flow diagram of a method for evaluating parameters and providing a reminder to reposition a hand input device.

FIG. 9 is a flow diagram of a method 900 for evaluating parameters against conditions, and providing a reminder to an operator to reposition a hand input device in response to certain conditions being met by the parameters. The method 900 is described utilizing blocks 910 through 950. In alternate examples, the method 900 may include more or fewer blocks than blocks 910 through 950. In addition, the blocks utilized to perform the method 900 may be performed in a different order than shown in FIG. 9. In the example depicted in FIG. 9, the method 900 is described utilizing the set of parameters described illustrated in FIGS. 7A and 7F. The method 900 may be performed by the control system of the computer-assisted robotic system, such as the control system 140 of FIG. 1. The method 900 begins at block 910, where in clutch mode of the computer-assisted robotic system, the control system 140 receives head input signals from head input sensors of a head input device, and hand input signals from hand input sensors of a hand input device. The head input device may comprise a display unit, such as display unit 112 of FIG. 1, for example.

From block 910, the method 900 proceeds to block 920. At block 920, the control system 140 receives and processes the head input signals and the hand input signals. For example, the control system 140 processes the head input signals and the hand input signals to determine various parameters, such as position, orientation, change in position, change in orientations, total translational motion, total angular motion, etc., of the head input device and/or the hand input device at one or more times instances after entry into the clutch mode.

From block 920 the method 900 proceeds to query blocks 925, 930, 935. In FIG. 9, the exemplary order of the blocks is 925, 930, 935. As noted above, the blocks of method 900 can be performed in different orders in difference instances. As an example, query blocks 925, 930, 935 may be performed in other orders. As specific examples, in various instances, block 930 is performed before block 925, block 935 is performed before block 925, or block 935 is performed before block 930. Further, one or more of the blocks 925, 930, 935 may be omitted, or replaced by query block for other conditions, while performing the method 900.

In the example depicted in FIG. 9, the control system 140 at block 925 determines if the parameters meet a condition consistent with the head input device having moved an amount greater than a head movement threshold $TH_{head}$. If the control system 140 determines that the system is in a "No" state at query block 925, the method 900 may terminate, or may return to block 910 along return paths 926, 975 shown in FIG. 9 for another iteration of the method 900. However, if the control system 140 determines that the system is in a "Yes" state at query block 925, then the method 900 proceeds to query block 930.

At query block 930, the control system 140 determines if the parameters meet a condition consistent with the hand input device having moved an amount greater than a hand movement threshold $TH_{hand}$. If the control system 140 determines that the system is in the "Yes" state at query block 930, the method 900 may terminate, or may return to block 910 along return paths 931, 975 shown in FIG. 9 for another iteration of the method 900. However, if the control system 140 determines that the system is in a "No" state at query block 930, then a reminder condition has been satisfied because the head input device has moved by an amount greater than $TH_{head}$ while the hand input device has not moved by an amount smaller than $TH_{hand}$.

In the example depicted in FIG. 9, if a "No" state is determined at query block 930, then the method 900 moves to query block 935. At query block 935, the control system 140 determines if the parameters meet a condition consistent with the head input device having moved an amount greater than a head large movement threshold $TH_{largemove}$. If the control system 140 determines that the system is in a "Yes" state at query block 935, the method 900 may terminate, or may return to block 910 along return paths 936, 975. However, if the control system 140 determines that the system is in a "No" state at query block 935, then the method 900 proceeds to block 940.

At block 940, the control system 140 provides a reminder to the operator to reposition the hand input device.

As stated above, the method 900 may be performed with more or fewer blocks than shown in FIG. 9. For example, method 900 may have no query blocks, one query block, or multiple query blocks for implementing a reminder refraining condition. Query blocks implementing a reminder refraining condition may be performed at any appropriate part of the method 900. For example, in some instances, one or more query blocks checking for a reminder refraining condition may be performed before, interleaved with, or after any more query blocks for a reminder provision condition. Further, in an implementation where the reminder refraining condition overrides one or more reminder provision conditions, satisfaction of the reminder refraining condition may bypass performance of the query blocks for the overridden reminder provision conditions (or even cause performance of the method 900 to return to block 910, if the implementation is such that satisfaction of the reminder refraining condition overrides all reminder provision conditions such that no reminder will be provided.)

From block 940, the method 900 proceeds to query block 945. Optionally at block 945, the control system 140 ceases provision of the reminder in response to the parameters satisfying a reminder cessation condition. As stated above, the method 900 may have no query blocks, one query block, or multiple query blocks for implementing a reminder cessation condition (e.g., query block 945). FIG. 9 shows two example reminder cessation conditions with the control system 140 determining if a period of time has passed since the providing of the reminder at block 940, if the parameters are consistent with the hand input device has moved an amount greater than a hand movement threshold $TH_{hand}$ after the reminder was provided at block 940.

If the control system 140 determines that the system is in a "No" state at query block 945, the method 900 then returns to block 940 and continues to provide the reminder to the operator. However, if the control system 140 determines that the system is in a "Yes" state at query block 945, then the method 900 moves to block 950, where the reminder provided to the operator is terminated. The method 900 terminates at block 950, or the method 900 may return to block 910 along return path 975 shown in FIG. 9 for another iteration through the method 900.

As described at least in part above, any of the threshold criteria may be determined via machine learning. Additionally, the relationship between head and hand movements as detected by the head and hand input devices may be expressed in an algorithm or model that analyses the relationship to conditionally determine if a reminder is to be generated to prompting the operator to move their hands to a target position. For example, machine learning classifier model, for example in the form of a linear regression, neural network, random forest, decision tree, k-means clustering, support vector machine or other suitable machine learning technique, is trained using supervised learning methods (i.e., active learning, classification, regression and the like) that will generate reminder signals based on the head and hand motion signals received from the hand and head input devices. The training set may be composed of examples of head and hand motion signals obtained during clutch modes from proficient operators so that the system may learn head and hand motion patterns indicative of when and if an operator should move their hands after moving their head. When such head and hand motion patterns indicate that an operator should move their hands after moving their head, the system would generate a reminder.

In other examples, a reminder to move the operator's hands to a target configuration or position may be configured as a haptic feedback provided through the hand input device. The haptic feedback may be provided as the sole reminder, or be provided in addition to one or more other reminders such as visual reminders or audible reminders. Haptic feedback can provide a reminder, and/or aid an operator's movement of the hand input device towards a certain configuration (e.g. more neutral configuration, closer to a target position, etc.) The certain configuration may be aligned with, and based on, the working pose of the operator's head, home position, etc.

In some examples, the target position has a shape, extents, and location defined based on a distance. Such a distance may be defined by the working pose of the operator's head, home position, etc. At least one, two or all of the following: the shape, extents, and location, may be a predefined and stored in the memory of the system, keyed in by the operator, selected from a menu residing in the memory of the system, retrieved from information stored in the memory of the system and associated with a unique operator or other identifier, or learned via machine learning through information obtained via the use of the system during teleoperation by a unique operator or other operators.

The target position may be defined as within a bounding region located based on the working pose of the operator's head, home position, etc. The bounding region has a location, shape and extents defined through one of the techniques described above or by other suitable technique. In one example, at least one, two, or all of the following: location, shape, and extents of, the bounding region that defined the target position is learned by the system through information obtained via the use of the system during teleoperation and stored in the memory of the system. The relationship between the bounding region and head working pose can be learned automatically (i.e., by machine learning) through teleoperation of the system by regularly sampling hand input device positions during teleoperation and estimating a bounding region with respect to the head reference frame. For example, a bounding region can be established by determining the 95th percentile extents of the hand input device positions along each of the principal axes in the head reference frame, and a center position of the bounding region can be defined by the centroid of the hand input device samples in the head reference frame. The learned location and/or size and/or extents of the bounding region is stored in a database and associated with a particular operator, a menu selection, default setting, or other operator identification for retrieval by the system upon exiting the teleoperation mode and entering the clutch mode.

In response to entering the clutch mode, haptic feedback generators, such as force actuators, ultrasonic generators, vibrotactile feedback, and the like, interfaced with the hand input device provide a haptic sensation (e.g., haptic feedback) to the operator through the hand input device. The haptic sensation may be provided as a pulse or continuous sensation. The haptic sensation may be based on the location of the hand input device relative to the target position. In one example, the magnitude of the haptic feedback may decrease as the hand input device moves closer to the target position. In another example, the haptic sensation is directional, such as a restoring force, to guide the operator to move the hand input device towards the target position. In one example, the haptic feedback is configured to signal an arrival and entry of the hand input device into the target position, for example, by decreasing the amount of feedback, ceasing the amount of feedback, providing a haptic detent or vibration, or providing another haptic sensation to the operator.

Figure 10A:
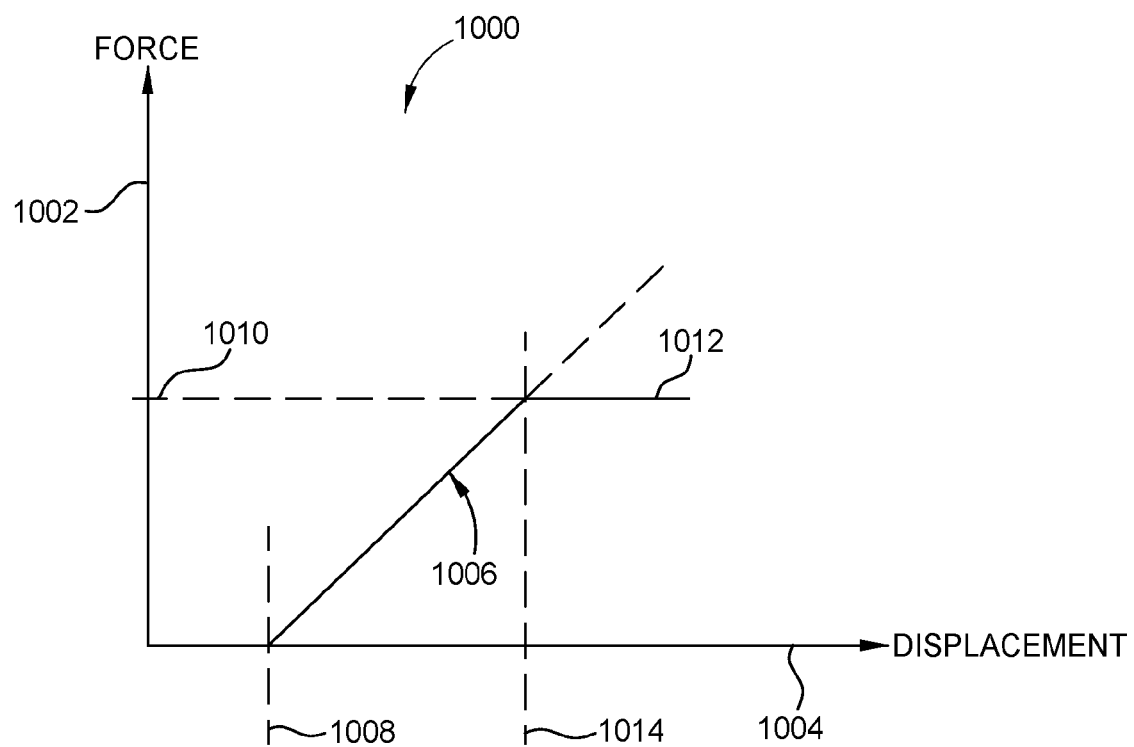
FIGS. 10A-10B are force and displacement diagrams illustrating exemplary relationships between force provided for haptic feedback and displacement of a hand input device.

FIG. 10A is a force and displacement diagram 1000 in which a relationship between haptic feedback (in this case, force) and displacement, shown as a haptic feedback plot 1006, of the hand input device is illustrated. In the haptic feedback plot 1006 illustrated in FIG. 10A, force applied to the hand input device is provided on the Y axis 1002, while position of the hand input device is provide provided on the X axis 1004. Although the plot 1006 is only illustrative of force responsive to displacements in the X direction, the total haptic feedback applied to the hand input device may be a summation of the force displacement relationship in multiple directions, for example, in the X, Y and Z directions. The haptic feedback plot 1006 may be modeled as a virtual spring and have a linear relationship between displacement and force (F=k*x), where k is the spring constant and x is the displacement beyond the bounding region. The spring constant k may or may not be linear. In some instances, the haptic feedback plot 1006 may have a zero force output for displacements of the hand input device that are less than a threshold 1008. In some instances, the haptic feedback plot 1006 may alternatively or additionally have a force output limit 1010 for displacements of the hand input device that would generate forces according to the model that would be in excess of a desired amount (as shown by the dashed extension of the plot 1006). In some instances where a force output limit 1010 is utilized, a region 1012 of the haptic feedback plot 1006 associated with displacements of the hand input device greater than a displacement 1014 that would output a force equal to or greater than the force output limit 1010 has a constant force output. Optionally, the haptic feedback plot 1006 may be smoothly ramped up or down, so that the forces are applied in a more "user pleasing" manner and to reduce the risk of a user losing control of the hand input device.

Figure 10B:
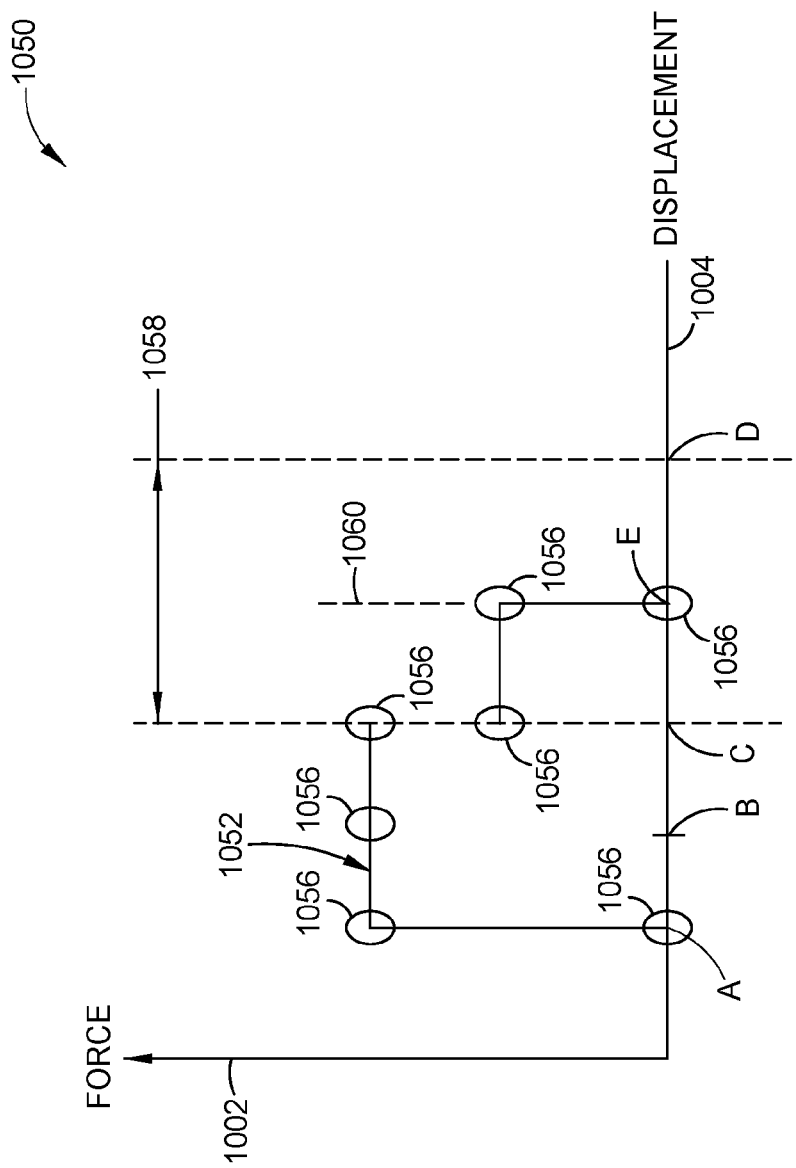

FIG. 10B is another instance of a force and displacement diagram 1050 in which a relationship between haptic feedback (in this case, force) and displacement, shown as a haptic feedback plot 1052, of the hand input device is illustrated. Similar to the plot 1006 of FIG. 10A, in the haptic feedback plot 1052 illustrated in FIG. 10B, force applied to the hand input device is provided on the Y axis 1002, while position of the hand input device is provide provided on the X axis 1004. The hand input device 1056 is shown in various positions along the X axis 1004 at different times (i.e., time $T_0$ through time $T_6$). The hand input device 1056 is shown in position A along the X axis 1004 while the system is operating in a teleoperation mode at time $T_0$. The haptic force applied to the hand input device 1056 while in position A at time $T_0$ is zero or a baseline force (coincident with the X axis 1004) normally applied to the hand input device during the teleoperation mode. When the system enters the clutch mode at time T1, the bounding region 1058 is set based at least in part on the position of the head of the operator as sensed by the head input device at time T1. Although the bounding region 1058 is three-dimensional, FIG. 10B illustrates a slice through the bounding region 1058 between positions C and D on the X axis 1004. The other dimensions of the bounding region 1058 have similar displacement and force relations. The size, extents and location of bounding region 1058 may be determined as discussed above, and in some examples, may be readjusted at different times based at least in part on the position of the head of the operator as sensed by the head input device at the current time.

At time $T_1$ while in the clutch mode, haptic feedback is provided as haptic force to the hand input device 1056 is increased as compared to the force applied to the hand input device 1056 while in the teleoperation mode. Although in FIG. 10, the hand input device 1056 is shown as not having moved in the x direction from position A from during the period from time $T_0$ to time $T_1$, it is contemplated that the hand input device 1056 may not be stationary when entering the clutch mode at time $T_1$, and as such, the hand input device 1056 may be slightly offset from position A at time $T_1$.

The haptic force provided at time $T_1$ reminds the operator to move the hand input device towards the bounding region 1058. The haptic force provided to the hand input device 1056 at time $T_1$ is directionally oriented towards the bounding region 1058. The haptic force may be modeled as virtual spring/damper, ramped towards a desired constant force over time. In one example, the haptic force provided to the hand input device 1056 is ramped to a constant force as the hand input device 1056 moves from position A at time $T_1$ to position B at time $T_2$, where position B is closer to the bounding region 1058 than position A. In another example, the haptic force provided to the hand input device 1056 decreases as the hand input device 1056 moves from position A to position B. The decrease in force applied to the hand input device 1056 when moving between positions A and B provides a directional sensation to the operator to guide the hand input device 1056 towards the bounding region 1058. In other examples, the force applied at time $T_1$ and time $T_2$ are the same.

As the hand input device 1056 reaches the edge of the bounding region 1058 at position C and time $T_3$, the haptic force applied to the hand input device 1056 changes at time $T_4$ to alert the operator that the hand input device 1056 is entering or has entered the bounding region 1058. The haptic force applied to the hand input device 1056 at time $T_4$ may decrease to zero, decrease to the teleoperational or other baseline, or decrease to an intermediary force level between zero (or the baseline) and the force applied at time $T_3$. By decreasing the haptic force applied to the hand input device 1056 at time $T_4$ to an intermediary level, further motion of the hand input device 1056 may be guided to enable the operator to position the hand input device 1056 at a center position E of the bounding region 1058 at time $T_6$. The center of the bounding region 1058 is also shown by dashed line 1060. At any time after the hand input device 1056 enters the bounding region 1058, the operator may direct the system to exit the clutch mode and reenter another mode, such as the teleoperation mode.

Figure 11:
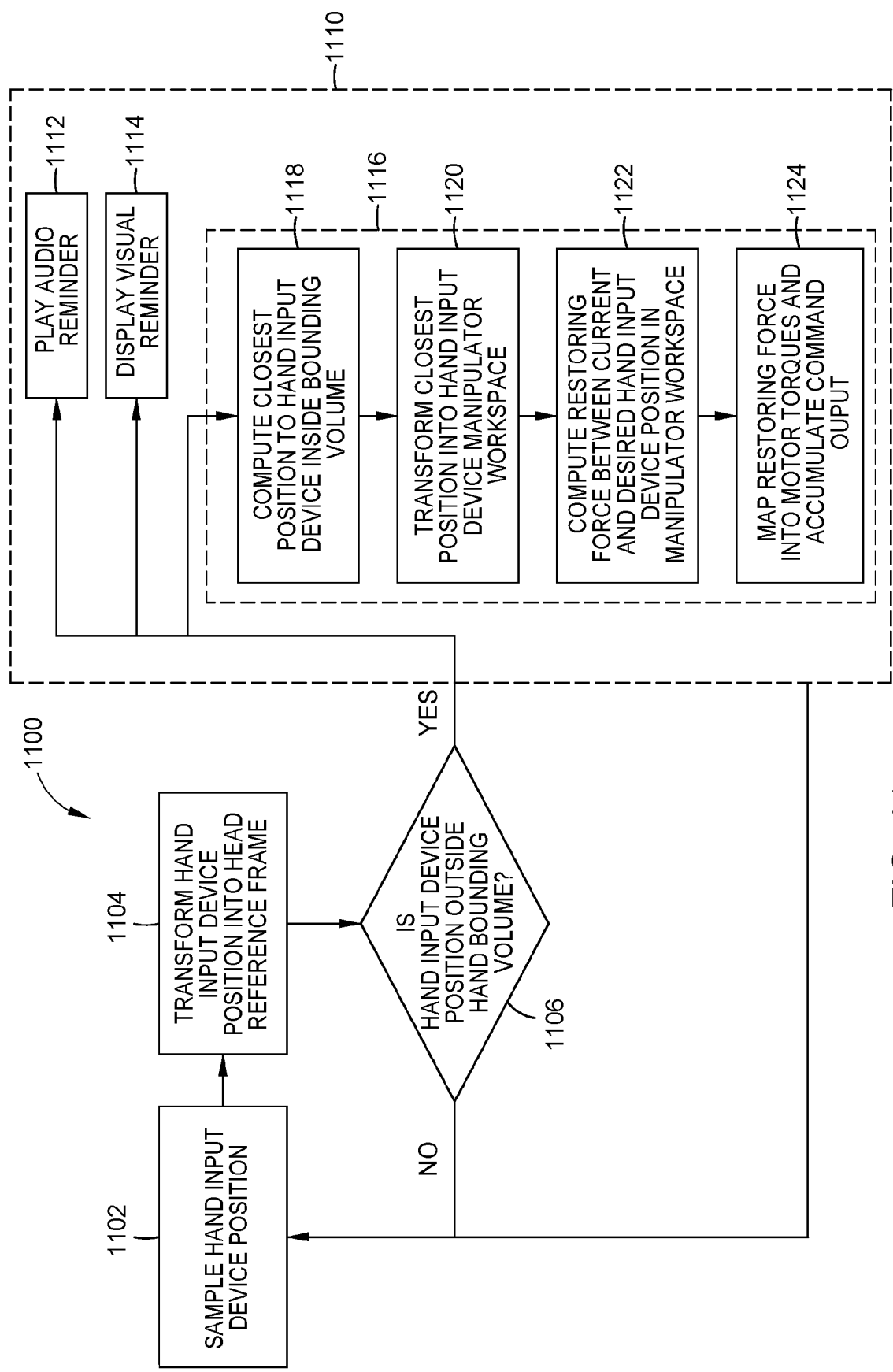
FIG. 11 is a schematic flow diagram of another example of a method for providing a reminder using a computer-assisted robotic system.

FIG. 11 is a schematic flow diagram of a method 1100 for providing a reminder during a clutch mode of a computer-assisted robotic system. The method 1100 begins at operation 1102 by entering the clutch mode. At operation 1102 while in the clutch mode, a position of the hand input device is sampled. At operation 1102 also while in the clutch mode, a bounding region is set based in part on a head pose sensed by the head input device. At operation 1104, the sampled hand input device position is related to the head input device position. For example, the sampled hand input device position can be transformed into a head reference frame indicative of the current position of the head input device.

At operation 1106, a determination is made if the position of the hand input device is outside the bounding region. The determination may be made through any of the techniques described herein, or other suitable technique. If the position of the hand input device is within the bounding region, the method 1100 then returns to operation 1102 and method 1100 repeats until the system exits the clutch mode. If the position of the hand input device is outside of the bounding region, then the method 1100 moves to operation 1110 and provides a reminder to the operator to move the hand input device.

Operation 1110 may be performed by providing at least one or more of a reminder to the operator. In one example, operation 1110 may be performed at sub-operation 1112 by providing an audible reminder. The audible reminder may be a chime, bell, voice message or other audible cue that alerts that operator that the hand input device should be moved to a more neutral position or closer to the target position.

In another example, operation 1110 may be performed at sub-operation 1114 by providing a visual reminder. The visual reminder may be any of the visual reminders described herein or other suitable visual cue that alerts that operator that the hand input device should be moved to a more neutral position or closer to the target position. The visual reminder provided at sub-operation 1114 may be provided alternatively or in addition to the audible reminder provided at sub-operation 1112.

In yet another example, operation 1110 may be performed at sub-operation 1116 by providing a haptic feedback reminder. The haptic feedback may be any of the haptic feedback reminders provided to the hand input device described herein or other suitable haptic cue that alerts that operator that the hand input device should be moved to a more neutral position or closer to a target position. The haptic reminder provided at sub-operation 1116 may be provided alternatively or in addition to the audible reminder provided at sub-operation 1112. The haptic reminder provided at sub-operation 1116 may be provided alternatively or in addition to the visual reminder provided at sub-operation 1114. The haptic reminder provided at sub-operation 1116 may also be provided in addition to both audible and visual reminders provided at sub-operations 1112, 1114.

In one example, sub-operation 1116 may be performed by executing sub-routines 1118-1124. At sub-routine 1118, the closest position of the bounding region to the hand input device is determined. At sub-routine 1120, the closest position of the bounding region is provided as an input to a hand input device controller and transformed into a hand input device manipulator workspace of the controller. At sub-routine 1122, a haptic force vector is computed by the controller to direct the hand input device from the current position (determined at operation 1102) and the desired position, i.e., within the bounding region. At sub-routine 1124, the haptic force vector is mapped to the haptic generators, for example by motor torques provide to the haptic force generators, and utilized to provide a haptic force that directionally guides the hand input device towards the desired position.

After one or more reminders have been provided the operation 1110, the method 1100 returns to operation 1102 to repeat the monitoring of the position of the hand input device while in the clutch mode to determine if a reminder to move hand input device should be provided to the operator.

While the foregoing is directed to embodiments of the present invention, other and further embodiments of the invention may be devised without departing from the basic scope thereof, and the scope thereof is determined by the claims that follow.

What is claimed is:

1. A computer-assisted robotic system comprising:
a head input device comprising one or more head input sensors configured to sense head inputs provided by a head of an operator of the robotic system, and to provide head input signals indicative of inputs sensed by the one or more head input sensors;
a hand input device comprising one or more hand input sensors configured to sense hand inputs provided by one or more hands of the operator, and to provide hand input signals indicative of inputs sensed by the one or more hand input sensors; and
a control system communicatively coupled to the head input device and to the hand input device,
wherein the control system is configured to, in a teleoperation mode:
command a change in a display of an image based on the head input signals, the image obtained by an imaging device, and
command motion of a tool based on the hand input signals, and wherein the control system is configured to:
provide a reminder for the operator to reposition the hand input device based on one or more parameters, the one or more parameters comprising a change in a position or an orientation of the head input device; and
refrain from providing the reminder in response to a determination that the hand input device has moved by an amount greater than a defined amount.

2. The computer-assisted robotic system of claim 1, wherein the one or more parameters comprises an amount of a motion of the head input device, and wherein the control system is configured to provide the reminder in response to the amount of the motion being higher than a defined threshold.

3. The computer-assisted robotic system of claim 1, wherein the one or more parameters further comprises an amount of a motion of the hand input device, and wherein the control system is configured to provide the reminder in response to the amount of the motion being lower than a defined threshold.

4. The computer-assisted robotic system of claim 1, wherein the one or more parameters further comprises: an amount of a translation of the hand input device from a previous position of the hand input device, and an amount of a translation of the head input device from a previous position of the head input device.

5. The computer-assisted robotic system of claim 4, wherein the previous position of the hand input device is a previously acquired home position for the hand input device, and wherein the previous position of the head input device is a previously acquired home position for the head input device.

6. The computer-assisted robotic system of claim 4, wherein the control system is configured to provide the reminder in response to a simultaneous occurrence of:
the amount of the translation of the hand input device being lower than a hand translation threshold; and
the amount of the translation of the head input device is higher than a head translation threshold.

7. The computer-assisted robotic system of claim 1, wherein:
the one or more parameters further comprise: an amount of a rotation of the hand input device from a previous orientation of the hand input device, and an amount of a rotation of the head input device from a previous orientation of the head input device; and
the control system is configured to provide the reminder in response to a simultaneous occurrence of: the amount of the rotation of the hand input device being lower than a hand rotation threshold, and the amount of the rotation of the head input device being higher than a head rotation threshold.

8. The computer-assisted robotic system of claim 1, wherein the one or more parameters comprises:
a change in a position of the hand input device;
a change in an orientation of the hand input device;
a change in a position of the head input device; and
a change in an orientation of the head input device.

9. The computer-assisted robotic system of claim 8, wherein the control system is configured to provide the reminder in response to a simultaneous occurrence of:
the change in position of the hand input device being lower than a hand translation threshold,
the change in orientation of the hand input device being lower than a hand rotation threshold,
the change in position of the head input device being higher than a head translation threshold, and
the change in orientation of the head input device being higher than a head rotation threshold.

10. The computer-assisted robotic system of claim 1, wherein the one or more parameters further comprises:
a position of the hand input device relative to a position of the head input device; or
a rotation of the hand input device relative to an orientation of the head input device.

11. The computer-assisted robotic system of claim 1, wherein the one or more parameters further comprises an amount of elapsed time following entry into a clutch mode.

12. The computer-assisted robotic system of claim 1, wherein the hand input device is a first hand input device, wherein the hand input signals are first hand input signals, and wherein the robotic system further comprises:
- a second hand input device comprising one or more second hand input sensors configured to sense second hand inputs provided by the one or more hands of the operator, and to provide second hand input signals indicative of inputs sensed by the one or more second hand input sensors,
- wherein the control system is further communicatively coupled to the second hand input device,
- wherein the control system is further configured to:
  - determine the one or more parameters based on the head input signals, the first hand input signals, and the second hand input signals, and
  - in the teleoperation mode, command a third tool based on the second hand input signals.

13. The computer-assisted robotic system of claim 12, wherein the one or more parameters comprises a comparison result, the comparison result comparing translations or rotations of the first and second hand input devices with a translation or a rotation of the head input device.

14. The computer-assisted robotic system of claim 12, wherein the one or more parameters comprise a change in a position of the first hand input device, a change in a position of the second hand input device, and a change in a position of the head input device, and wherein the control system is configured to provide the reminder in response to a simultaneous occurrence of:
- the change in the position of the head input device being higher than a head translation threshold; and
- at least one position change being lower than a hand translation threshold, the at least one position change selected from the group consisting of: the change in the position of the first hand input device and the change in the position of the second hand input device.

15. The computer-assisted robotic system of claim 14, wherein the at least one position change comprises both the change in the position of the first hand input device and the change in the position of the second hand input device.

16. The computer-assisted robotic system of claim 14, wherein the control system is configured to provide the reminder by, in response to only one of the changes in the positions of the first and second hand input devices being lower than the hand translation threshold:
- indicating which of the first and second hand input devices exhibited the change in the position lower than the hand translation threshold; or
- indicating a repositioning of a hand input device.

17. The computer-assisted robotic system of claim 1, wherein the reminder comprises a visual indicator, and wherein the visual indicator indicates:
- a current position of the hand input device compared to a previous position of the hand input device; or
- a current position of the head input device compared to a previous position of the head input device; or
- a direction to move the hand input device.

18. The computer-assisted robotic system of claim 1, wherein the control system is further configured to determine a direction of attention of the operator, and wherein the control system is configured to provide the reminder by:
- providing a visual indicator based on the direction of attention.

19. The computer-assisted robotic system of claim 1, wherein the control system is further configured to refrain from providing the reminder in response to at least one event selected from the group consisting of:
- passage of a pre-determined period of time;
- an exit from a clutch mode; and
- a lack of motion of the head input device after entry into the clutch mode.

20. The computer-assisted robotic system of claim 1, wherein the control system is further configured to refrain from providing the reminder in response to at least one event selected from the group consisting of:
- a determination that the head input device has achieved a pose that is within a defined deviation of a previous pose; and
- a determination that the head input device has moved with a speed exceeding a defined speed threshold.

21. The computer-assisted robotic system of claim 1, wherein the control system is further configured to:
- refrain from providing the reminder in response to the head input device exhibiting at least one motion characteristic selected from the group consisting of:
  - a head input device motion dominated by a pitching motion;
  - a head input device motion dominated by a change in height of the head input device;
  - a pitching of the head input device greater than a pitch threshold; and
  - a vertical translation of the head input device greater than a vertical movement threshold.

22. The computer-assisted robotic system of claim 1, wherein the control system is further configured to: refrain from providing the reminder in response to an occurrence of at least one event selected from the group consisting of:
- the head signals indicating that a position of the head input device has changed by greater than a large-move threshold; and
- the head signals indicating that a position of the head input device has changed by greater than a large-move threshold while a position of the hand input device has changed by less than a small-move threshold.

23. The computer-assisted robotic system of claim 1, wherein the reminder is a haptic feed-back provided to the hand input device, and wherein the haptic feed-back provided to the hand input device comprises:
- a restoring force directionally applied to the hand input device in a direction towards a closest position inside a bounding region defining a target position of one or more hands of the operator, and, wherein the target position is based upon a current position of the head of the operator sensed by the head input device.

24. A method for operating a computer-assisted robotic system comprising a head input device and a hand input device, the head input device configured to sense head inputs provided by a head of an operator of the robotic system, the hand input device configured to sense hand inputs provided by one or more hands of the operator, the method comprising:
- receiving head input signals indicative of inputs sensed by the head input device;
- receiving hand input signals indicative of inputs sensed by the hand input device;
- commanding, while the robotic system is in a teleoperation mode, a change in a display of an image based on the head input signals, the image obtained by an imaging device, the imaging device coupled to the robotic system;

commanding, while the robotic system is in the teleoperation mode, motion of a tool based on the hand input signals, the tool coupled to the robotic system;
providing, based on one or more parameters, a reminder for the operator to reposition the hand input device, the one or more parameters comprising a change in a position or an orientation of the head input device; and
refraining from providing the reminder in response to a determination that the hand input device has moved by an amount greater than a defined amount.

25. A non-transitory machine-readable medium comprising a plurality of machine-readable instructions that, when executed by one or more processors associated with a robotic system, cause robotic system to:
command, while the robotic system is in a teleoperation mode, a change in a display of an image based on head input signals indicative of inputs sensed by one or more head input sensors of a head input device, the image obtained by an imaging device;
command, while the robotic system is in the teleoperation mode, motion of a tool based on hand input signals indicative of inputs sensed by one or more hand input sensors of a hand input device;
provide a reminder for an operator to reposition the hand input device based on one or more parameters, the one or more parameters comprising a change in a position or an orientation of the head input device; and
refrain from providing the reminder in response to a determination that the hand input device has moved by an amount greater than a defined amount.

* * * * *